(12) United States Patent
Mizuno

(10) Patent No.: US 6,609,176 B1
(45) Date of Patent: Aug. 19, 2003

(54) DISK CONTROL SYSTEM AND DATA REARRANGEMENT METHOD

(75) Inventor: Satoshi Mizuno, Ome (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 119 days.

(21) Appl. No.: 09/662,220

(22) Filed: Sep. 14, 2000

(30) Foreign Application Priority Data

Dec. 27, 1999 (JP) .......................................... 11-371560
Jun. 29, 2000 (JP) ...................................... 2000-195895

(51) Int. Cl.⁷ .............................................. G06F 12/00
(52) U.S. Cl. ...................... 711/114; 711/112; 711/118
(58) Field of Search ................................. 711/114, 112, 711/134, 136, 118; 714/7

(56) References Cited

U.S. PATENT DOCUMENTS

| | | | |
|---|---|---|---|
| 5,333,311 A | | 7/1994 | Whipple, II ................. 395/600 |
| 5,488,701 A | * | 1/1996 | Brady et al. ........... 395/182.04 |
| 5,551,003 A | * | 8/1996 | Mattson et al. .............. 711/112 |
| 5,604,902 A | | 2/1997 | Burkes et al. ............... 395/622 |
| 5,734,861 A | * | 3/1998 | Cohn et al. .................. 395/461 |
| 5,799,324 A | * | 8/1998 | McNutt et al. ............. 707/206 |
| 5,802,344 A | * | 9/1998 | Menon et al. ............... 395/492 |
| 5,812,753 A | | 9/1998 | Chiariotti ............... 395/182.04 |
| 5,933,840 A | * | 8/1999 | Menon et al. ............... 707/206 |
| 6,105,103 A | * | 8/2000 | Courtright, II et al. .......... 711/1 |
| 6,151,685 A | * | 11/2000 | Li et al. ........................ 714/6 |
| 6,321,239 B1 | * | 11/2001 | Shackelford ................. 707/206 |

FOREIGN PATENT DOCUMENTS

| | | |
|---|---|---|
| JP | 7-56691 | 3/1995 |
| JP | 7-200369 | 8/1995 |
| JP | 10-11337 | 1/1998 |
| JP | 11-53235 | 2/1999 |
| JP | 11-142745 | 5/1999 |
| JP | 11-194899 | 7/1999 |

OTHER PUBLICATIONS

S. Kazunori et al., "RAID BOOSTER," Toshiba Review (1999), 54:13–17.

\* cited by examiner

Primary Examiner—Hiep T. Nguyen
Assistant Examiner—Ngoc Dinh
(74) Attorney, Agent, or Firm—Finnegan, Henderson, Farabow, Garrett & Dunner, L.L.P.

(57) ABSTRACT

Each logical stripe is subjected to a judgment whether or not it should be selected as object of repack (rearrangement) by referring to an address conversion table. For the judgment, $\alpha$ representing the percentage of valid logical block numbers and $\beta$ representing the percentage of the consecutive logical address numbers of adjacently located logical blocks are computationally determined. Each logical stripe that satisfies the requirement that "$\alpha$ is not smaller than a predetermined value A and $\beta$ is not greater than a predetermined value B" is subjected to a repack processing operation. As a result, logical stripes whose valid blocks are physically distributed can be subjected to a repack processing operation with priority.

28 Claims, 18 Drawing Sheets

| PHYSICAL STRIPE | | | | | | | | |
|---|---|---|---|---|---|---|---|---|
| NO.0 (TS=4) | 151 | 152 | 153 | 154 | — | — | 13 | 14 | 157 | — | α=70% β=44% |
| NO.1 (TS=7) | 79 | 80 | 81 | 5 | 3 | 90 | — | 99 | 4 | — | α=80% β=22% |
| NO.2 (TS=5) | — | — | — | — | 70 | — | — | 73 | — | — | α=20% β=0% |
| NO.3 (TS=1001) | 155 | 156 | — | 20 | 21 | 25 | 26 | 22 | 23 | 24 | α=90% β=55% |
| NO.1500 (TS=6) | 0 | 30 | 40 | 60 | 62 | 71 | 59 | 41 | 31 | 33 | α=100% β=0% |

FIG. 3

○ : NEWLY COLLECTED BLOCKS

| LOGICAL BLOCK NUMBER (INDEX) | ADDRESS CONVERSION TABLE | 172 PHYSICAL BLOCK NUMBER |
|---|---|---|
| 0 | 30 | |
| 1 | 31 | |
| 2 | 32 | |
| 3 | 33 | |
| LOGICAL STRIPE No.0   4 | — | α=70% |
| 5 | — | β=44% |
| 6 | 133 | |
| 7 | 134 | |
| 8 | 237 | |
| 9 | — | |
| 10 | 179 | |
| 11 | 180 | |
| 12 | 181 | |
| 13 | 205 | |
| LOGICAL STRIPE No.1   14 | 203 | α=80% |
| 15 | 290 | β=22% |
| 16 | — | |
| 17 | 299 | |
| 18 | 205 | |
| 19 | — | |
| 20 | — | |
| 21 | — | |
| 22 | — | |
| 23 | — | |
| LOGICAL STRIPE No.2   24 | 70 | α=20% |
| 25 | — | β= 0% |
| 26 | — | |
| 27 | 73 | |
| 28 | — | |
| 29 | — | |
| 30 | 60 | |
| 31 | 61 | |
| 32 | 62 | |
| 33 | 63 | |
| LOGICAL STRIPE No.3   34 | 155 | α=90% |
| 35 | 156 | β=44% |
| 36 | 113 | |
| 37 | 159 | |
| 38 | 157 | |
| 39 | — | |
| 40 | ⋮ | |
| 41 | ⋮ | |

FIG. 15

DISK CONTROL SYSTEM AND DATA REARRANGEMENT METHOD

CROSS-REFERENCE TO RELATED APPLICATIONS

This application is based upon and claims the benefit of priority from the prior Japanese Patent Applications No. 11-371560, filed Dec. 27, 1999; and No. 2000-195895, filed Jun. 29, 2000, the entire contents of which are incorporated herein by reference.

BACKGROUND OF THE INVENTION

This invention relates to a data control system and a data rearrangement method. More particularly, the present invention relates to a disk control system using a log-structured write-in scheme and a data rearrangement method applicable to such a system.

In recent years, computer systems provided with a RAID (redundant array of independent disks) feature are in the main stream. Various types of RAID technology are known to date and they include the 0, 1, 10 and 5 types.

Recently, log-structured file systems (LSFS) have been proposed to improve the write-in performance of a RAID. The log-structured file system represents a technique for improving the performance of a RAID by utilizing the characteristic property of a disk unit that "the sequential access is by far faster than the random access". The fall in the efficiency of a computer system during a random access process is attributable to the time consumed for a seek operation and in waiting for a rotary motion of the disk and hence such a fall of efficiency is desirably eliminated. Thus, with the log-structured file system technology, a buffer is used to store the data, and the data to be written into a plurality of small blocks are transformed into a large mass of data to be written by section of a technique of "batch writing" for writing data in a batch. With this technique, an operation of randomly writing data is changed to an operation of sequentially writing data to improve the writing performance of the system.

However, with the log-structured file system technology, the data to be written are rearranged according to the order of the write requests issued for the data. Therefore, once random writing occurs, data with logical addresses that are widely separated from each other are consecutively written in a single physical stripe region. As a result, data blocks with consecutive logical addresses of a file system are stored in different physical stripe regions that are physically remote from each other. Then, the operation of sequentially reading the data stored in physically dispersed regions is in fact physically a random reading operation and hence is poorly efficient.

The data to be written have to be rearranged periodically in order to correct such a situation and make the data to be physically continuously arranged. However, the operation of rearranging the data represents a heavy load to the system that involves many I/O processing operations.

BRIEF SUMMARY OF THE INVENTION

It is an object of the present invention to provide a disk control system and a data rearrangement method that are adapted to efficiently rearrange data and greatly improve the efficiency of data reading operations with a small load applied to the system.

According to the present invention, there is provided a disk control system using a log-structured write-in scheme and adapted to store data to be written in a buffer and write a plurality of data blocks, which are stored in the buffer, in a disk unit in unit of one physical stripe formed of a continuous storage region of the disk unit, the disk control system comprising a data rearrangement section configured to rearrange the data written in the disk unit in units of one block so as to make data with consecutive logical addresses to be written physically consecutively, a rearrangement stripe determination section configured to computationally determines at least one of a percentage of valid blocks and a percentage of the consecutive logical address numbers of adjacently located logical blocks in each physical stripe and determining the physical stripes to be reconstructed by the data rearrangement section as objects of rearrangement.

With a disk control system having the above configuration, the percentage of valid blocks and/or the percentage of the consecutive logical address numbers of adjacently located logical blocks is computationally determined for each physical stripe and the physical stripes to be rearranged by the data rearrangement section as objects of rearrangement are selected on the basis of the outcome of the computation. Since a physical stripe showing a low percentage of valid blocks is wasting the disk capacity, such a physical stripe should be selected with priority as object of rearrangement. A physical stripe showing a low percentage of valid blocks can be reused as empty stripe by processing it for data rearrangement. Additionally, a physical stripe containing valid blocks to a certain extent that are not arranged consecutively does not provide a high efficiency for a sequential read operation. Then, the efficiency of sequential read operation can be improved by selecting such a physical stripe as object of rearrangement.

In the present invention, when data rearrangement processing is executed, the necessity of carrying out a data rearrangement operation is determined for the physical stripes in the order of time and date of generation and the physical stripe with the oldest time and date of generation is selected as object of data rearrangement with priority. From the viewpoint of locality of file systems, a physical stripe whose time and date of generation is old can be assumed to contain valid blocks that are hardly selected as objects of rewriting. The frequency of occurrence of a new writing operation can be minimized for the data collected by data rearrangement and hence operations of ineffective rearrangement can be prevented from taking place by carrying out a data rearrangement operation for physical stripes whose time and date of generation is old.

The data rearrangement operation of the data rearrangement section is executed each time when a physical stripe is selected by the rearrangement stripe determination section as object of rearrangement. With this arrangement, the operation of computationally determining the percentage of valid blocks and/or the percentage of the consecutive logical addresses of adjacently located blocks for the next physical stripe is conducted after the completion of the operation of rearrangement for the current physical stripe selected as object of rearrangement so that the percentage of valid blocks and/or the percentage of the consecutive logical addresses of adjacently located blocks can be determined accurately by taking the invalid blocks into consideration.

A disk control system as defined above additionally comprises a management section which controls the number of times of references to any of the data contained in each physical stripe, the rearrangement stripe determination section being adapted to determine a physical stripe showing a number of times of references per unit time above a predetermined value as object of rearrangement with priority.

With this arrangement of selecting data blocks that are frequently read with priority to arrange its physical storage regions continuously, the reading performance of the system can be remarkably improved.

Alternatively, a disk control system as defined above may additionally comprise a computation section which obtains an aggregate of valid blocks contained in the selected physical stripe for each of the logical stripe numbers allocated to the valid blocks on the basis of the logical addresses of the valid blocks and computing the number of elements of the aggregate having the largest number out of the aggregates formed by the section, the rearrangement stripe determination section being adapted to determine a physical stripe showing a number of elements as determined by the computation below a predetermined value as object of rearrangement with priority. Generally, data can be accessed at high speed for reading if they are not arranged consecutively in a rigorous sense of the word but found physically close to each other. Therefore, it is desirable to rearrange a physical stripe showing a low degree of concentration of data with priority by determining the degree of concentration of each physical stripe by means of the above described technique.

When the physical stripe data rearranged on the empty region of the disk device are batch-written in the disk unit, the data rearrangement section generates data of the physical stripe by block data belonging to an identical logical stripe number contained in the physical stripe to be rearranged and remaining block data belonging to the logical stripe number collected from the other physical stripe other than the physical stripe to be rearranged.

In such a manner, by aggregating the blocks in a new physical stripe in units of the aggregate of the logical blocks, the data blocks in the physical blocks to be rearranged can be rearranged en masse in an optimum state. As a result, it is avoided in the rearrangement processing to move the same logical block at a plurality of times, so that the efficiency of the rearrangement processing is improved.

Then, the data rearrangement section arranges the data blocks of the new physical stripe in the order of logical block number to improve the efficiency of sequentially reading the blocks.

The data blocks of a physical stripe generated very recently can be selected frequently as object of write operation. Then, if such data blocks are moved for rearrangement, they may be moved again to some other physical stripe as a result of a subsequent write operation to make the initial move ineffective. Therefore, preferably, the data rearrangement section excludes the blocks of a physical stripe having a life time not longer than a predetermined value since the generation from the objects of the collection for rearrangement.

A disk control system as defined above further comprises an additional rearrangement section which rearranges the physical stripes showing a percentage of the consecutive logical addresses of adjacently located blocks not smaller than a predetermined value on a physical stripe by physical stripe basis. With this arrangement, it is possible to establish continuity of data blocks in terms of boundaries of physical stripes.

According to the present invention, there is provided a disk control system using a log-structured write-in scheme, the disk control system comprising a disk array constructed by a plurality of disk units, a data buffer which stores a plurality of data blocks requested to be written, a data write-in section which generates to-be-written data corresponding to a physical stripe allocated to the disk array out of the plurality of data blocks stored in the data buffer and writes them collectively in the physical stripe, an address conversion table which stores, for each logical stripe, correspondence relations between a plurality of block numbers of a plurality of logical blocks of the logical stripe of the disk array and a plurality of physical block numbers indicating the physical positions on the disk array at which the data blocks specified by the logical block numbers exist, rearrangement stripe determination section which computes at least one of a percentage of valid logical blocks on the logical stripe and a percentage of consecutive physical address numbers on the logical blocks to obtain a result, and determines the logical stripe as object of rearrangement when the result satisfies a predetermined condition, a data rearrangement section which reads out the data blocks of the logical stripe determined by the rearrangement stripe determination section as object of rearrangement and causes the data write-in section to write them in an empty physical stripe region of the disk array, and an address conversion table rewriting section which rewrites the physical block numbers of the address conversion table as physical block numbers of the empty physical stripe.

With such a disk control system, the extent of physical dispersion of logical blocks can be determined for each logical stripe by referring to the address conversion table. More specifically, for each logical stripe, the system determines the percentage of valid logical block numbers and/or the percentage of the consecutive logical address numbers of adjacently located logical blocks in the logical stripe and determines the logical stripe as object of rearrangement when the obtained result satisfies predetermined conditions. Logical stripes showing a low percentage of valid logical block numbers are preferably excluded from the objects of rearrangement because no remarkable effect can be expected if such logical stripes are rearranged. Additionally, the efficiency of sequentially reading logical stripes that contain valid logical blocks to a certain extent but show a poor consecutiveness of physical block numbers is rather poor and hence the efficiency of sequential read can be improved by selecting the data blocks of such logical stripes as objects of rearrangement.

According to the present invention, there is also provided a disk control system using a log-structured write-in scheme, the disk control system comprising a disk array constructed by a plurality of disk units, a data buffer which stores a plurality of data blocks requested to be written, a data write-in section which generates to-be-written data corresponding to a physical stripe allocated to the disk array out of the plurality of data blocks stored in the data buffer and writes them collectively in the predetermined physical stripe of the disk array, an address conversion table which stores, for each logical stripe, correspondence relations between a plurality of logical block numbers of a plurality of logical blocks of the logical stripe of the disk array and a physical block numbers indicating the physical positions on the disk array at which the data blocks specified by the logical block numbers exist, a counter section arranged for each logical stripe of a logical stripe management table and adapted to count the number of times of data reads for the logical blocks contained in the logical stripe, a rearrangement stripe determination section which determines the logical stripe showing a number of times of data reads not smaller than a predetermined value as object of rearrangement by referring to the counter section, a data rearrangement section which reads out the data blocks of the logical stripe determined by the rearrangement stripe determination section as object of rearrangement and causes the data write-in section to write them in an empty physical stripe region of the disk array, and an address conversion table rewriting section which rewrites the physical block numbers of the address conversion table as physical block numbers of the empty physical stripe.

With this arrangement, a logical stripe show a large number of times of data reads is selected as object of data rearrangement so that the data blocks in the logical stripe that is frequently read can be arranged physically consecutively to raise the efficiency of sequential reading.

According to the present invention, there is also provided a disk control system using a log-structured write-in scheme, the disk control system comprising a disk array constructed by a plurality of disk units, a data buffer which stores a plurality of data blocks requested to be written, a data write-in section which generates data to be written for a physical stripe of the disk array out of the plurality of data blocks stored in the data buffer and writes them collectively in the predetermined physical stripe of the disk array, an address conversion table which stores for each logical stripe the correspondence between the plurality of logical block numbers of the logical stripe of the disk array and the physical block numbers indicating the physical positions on the disk array of the data blocks specified by the logical block numbers, a counter section arranged for each logical stripe of a logical stripe management table and adapted to count the number of times of data write-ins for the logical blocks contained in the logical stripe, a rearrangement stripe determination section which determines the logical stripe showing a number of times of data write-ins not smaller than a predetermined value as object of rearrangement by referring to the counter section, a data rearrangement section which reads out the data blocks of the logical stripe determined by the rearrangement stripe determination section as object of rearrangement and causes the data write-in section to write them in an empty physical stripe region of the disk array, and an address conversion table rewriting section which rewrites the physical block numbers of the address conversion table as physical block numbers of the empty physical stripe.

A logical stripe can become physically discontinuous when data is written in any of its logical blocks. Therefore, the efficiency of sequential access can be improved effectively by selecting logical stripes showing a number of times of data write-ins not smaller than a predetermined value as objects of rearrangement.

According to the present invention, there is provided a data rearrangement method to be applied to a control system using a log-structured write-in scheme and adapted to store data in a buffer and write the plurality of blocks, which stored in the buffer, in a disk unit in units of one physical stripe formed of a continuous storage region of the disk unit, the data rearrangement method comprising steps of rearranging the data written in the disk unit in units of one block so as to make data with consecutive logical addresses to be written physically consecutively, and computationally determining at least one of a percentage of valid blocks and a percentage of the consecutive logical address numbers of adjacently located logical blocks in each physical stripe and determining the physical stripes to be reconstructed in the data rearranging step as objects of rearrangement.

According to the present invention, there is provided data rearrangement method to be applied to a control system using a log-structured write-in scheme and adapted to store data in a buffer and write the plurality of blocks, which are stored in the buffer, in a disk unit in units of one physical stripe formed of a continuous storage region of the disk unit, the data rearrangement method comprising steps of determining the physical stripe as object of rearrangement, and rearranging the data written in the disk unit in units of one block so as to make data with consecutive logical addresses to be written physically consecutively, when the physical stripe data rearranged on the empty region of the disk unit are batch-written in the disk unit, the data rearrangement step including generating data of the physical stripe by block data belonging to an identical logical stripe number contained in the physical stripe to be rearranged and remaining block data belonging to the logical stripe number collected from the other physical stripe other than the physical stripe to be rearranged.

According to the present invention, there is provided a data rearrangement method for rearranging the data blocks stored in a disk array comprising a plurality of disk units, the method comprising steps of storing a plurality of data blocks requested to be written in a data buffer, generating data to be written for a physical stripe of the disk array out of the plurality of data blocks stored in the data buffer, writing them collectively in a predetermined physical stripe of the disk array, generating an address conversion table for storing for each logical stripe the correspondence between the plurality of logical block numbers of the logical stripe of the disk array and the physical block numbers indicating the physical positions on the disk array of the data blocks specified by the logical block numbers, counting the number of times of data reads for the logical blocks contained in each logical stripe, determining the logical stripe showing a number of times of data reads not smaller than a predetermined value as object of rearrangement by referring to the counting step, rearranging data by reading out the data blocks of the logical stripe determined as object of rearrangement, writing them in the empty physical stripe region of the disk array produced by the collectively writing step, and rewriting the physical block numbers of the address conversion table as physical block numbers of the empty physical stripe as a result of the data rearrangement.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 3 is a schematic illustration of physical stripes that can be used in the disk unit of the computer system of FIG. 1;

FIG. 15 is a schematic illustration of the address conversion table arranged in the computer system of FIG. 1;

DETAILED DESCRIPTION OF THE INVENTION

Now, the present invention will be described in detail by referring to the accompanying drawing that illustrates preferred embodiments of the invention.

Figure 1:
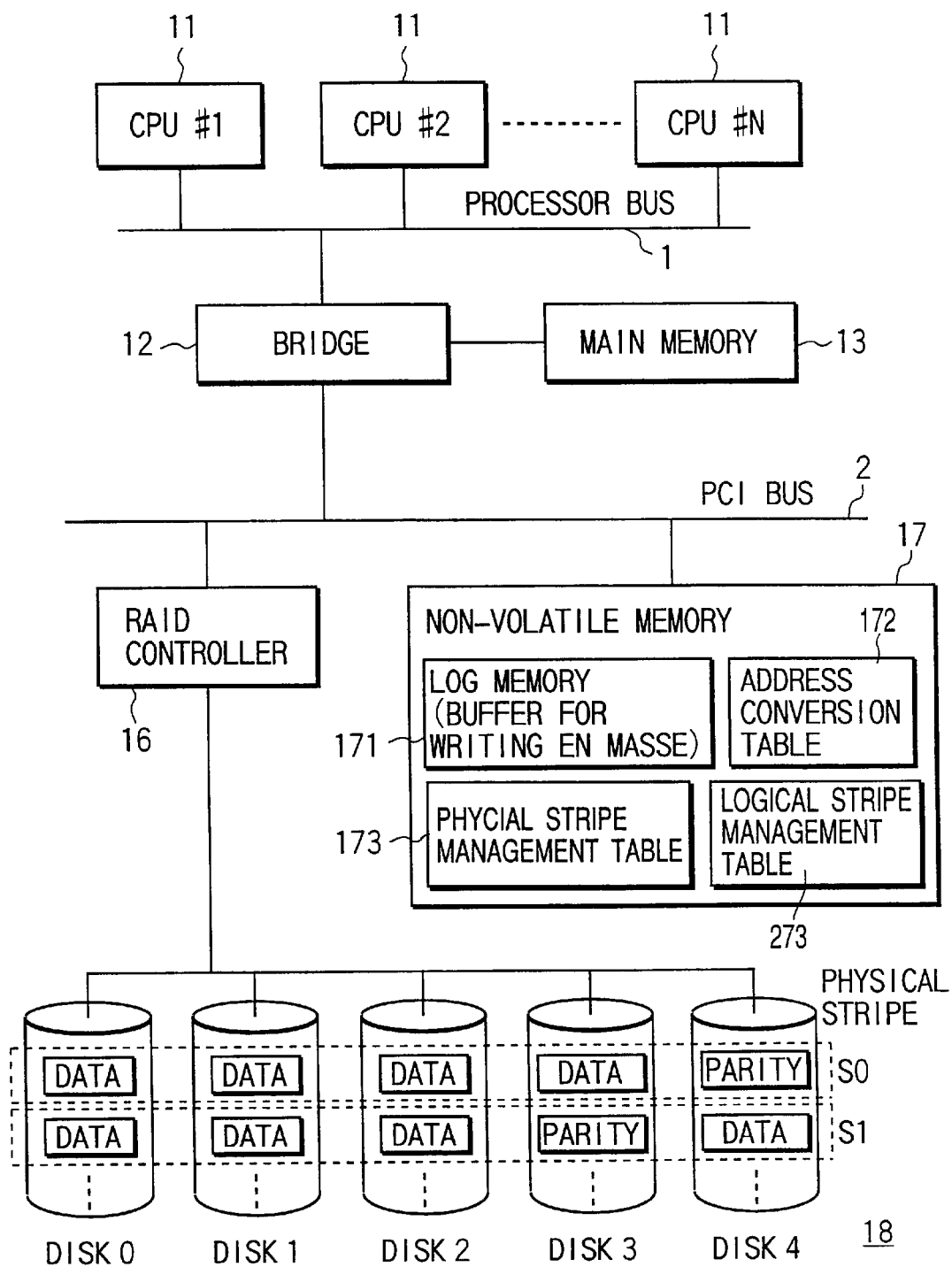
FIG. 1 is a schematic block diagram of a computer system realized as an embodiment of the invention.

FIG. 1 is a schematic block diagram of a computer system realized as an embodiment of the invention. The computer system is designed to operate as server (PC server) and can be equipped with a plurality of CPUs 11. As shown, each of the CPUs 11 is connected to a bridge 12 by way of a processor bus 1. The bridge 12 is a bridge LSI adapted to bidirectionally connect the processor bus 1 and PCI bus 2 and contains a memory controller for controlling main memory 13. The main memory 13 is loaded with an operating system (OS), application programs to be executed and drivers.

As shown in FIG. 1, the PCI bus 2 is connected to a RAID controller 16 and a non-volatile memory 17. The disk array 18 controlled by the RAID controller 16 is used for storing user's various data.

The disk array 18 operates typically as a disk array having, for example, a RAID 5 configuration under the control of the RAID controller 16. When the disk array 18 operates as such, it comprises N+1 disk units including N disk units for storing data and a disk unit for storing parities (a total of five disk units DISK0 through DISK4 in the case of FIG. 1). The N+1 disk units are grouped to operate as single logic disk drive.

As shown in FIG. 1, physical stripes (parity groups) comprising data and their parities are assigned to the group disk units and the parity positions of the physical stripes are shifted sequentially in the N+1 disk units. For example, the data (DATA) of the physical stripe SO are assigned to the stripe units located at the same positions in the DISK0 through DISK3 and their parities are stored on the corresponding stripe unit of the DISK4. Then, the parities of the data (DATA) of the physical stripe S1 are stored on the strip unit of the DISK3 corresponding to the stripe units to which the data are assigned. The parities are distributed among the N+1 disks on the basis of the unit of physical stripe in this way to prevent any concentrated accesses to a disk dedicated to parities from taking place.

The non-volatile memory 17 improve the write performance relative to the disk array 18 having the RAID 5 configuration by using a log-structured file system (LSFS). The non-volatile memory 17 is realized as a PCI extension card connectable to a PCI slot.

There will now be described a principal of a write control operation controlled by a high speed driver (LSFS) 100 connected to the non-volatile memory 17.

In the write-in scheme using the technique of log-structured file system (LSFS), the position for writing data is not determined according to the logical address requested for a write operation by the host (the file system of the OS in this embodiment) but a large data block containing a plurality of blocks of data to be written is formed by sequentially storing data to be written sequentially according to the write requests of the host and then the large data block is "batch written" sequentially from above in an empty region of the disk array 18. The unit to be used for "batch writing" is a physical stripe. In other words, an empty physical stripe is generated for each operation of "batch writing" and a data block good for the physical stripe is sequentially written there. As a result, random accesses can be converted into sequential accesses to greatly improve the writing performance of the system.

Figure 2:
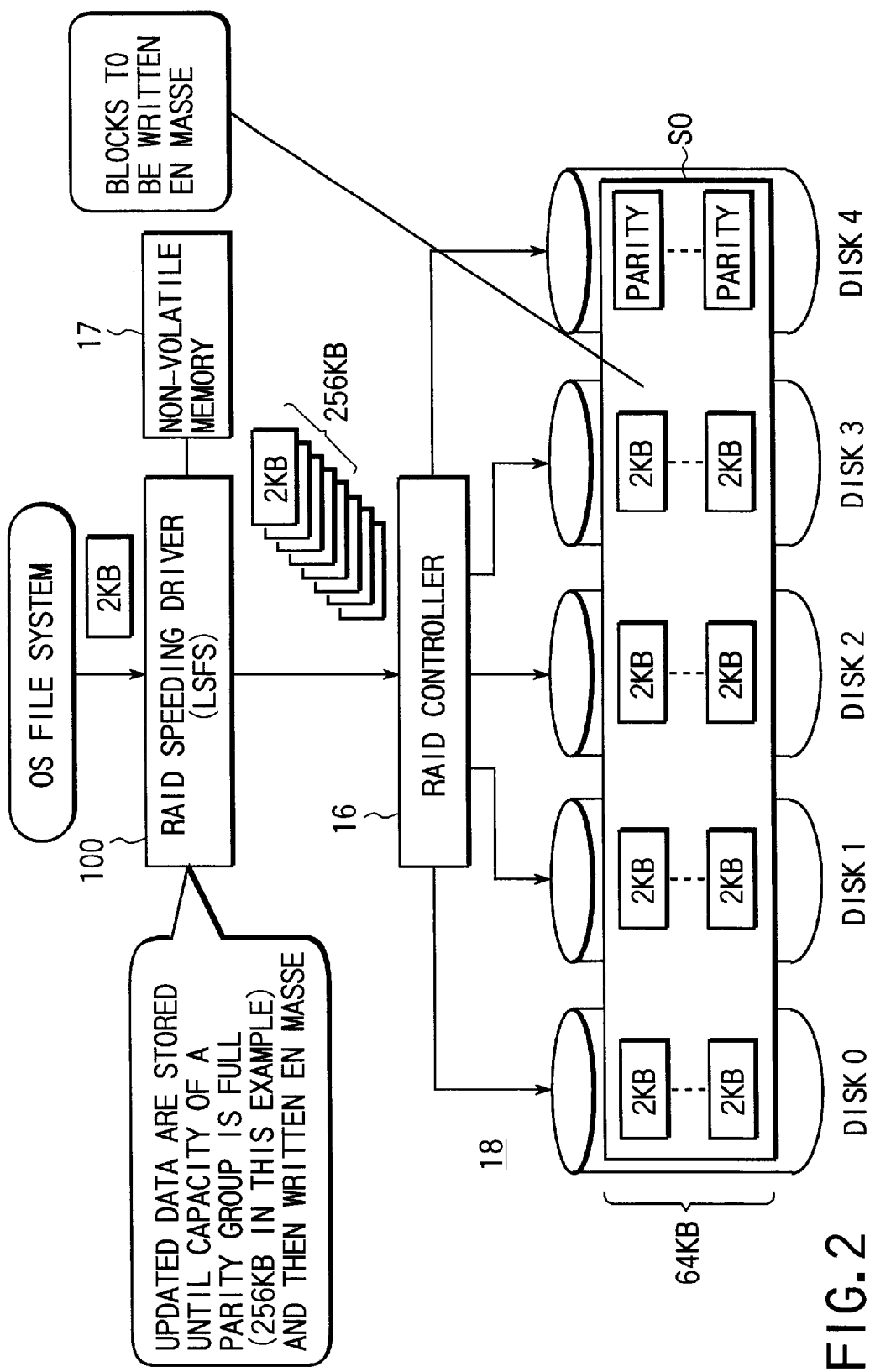
FIG. 2 is a schematic block diagram of the disk unit of the computer system of FIG. 1, illustrating the principle of write-in operation.

FIG. 2 is a schematic block diagram of the disk unit of the computer system of FIG. 1, where the block data size of the data to be written that are transmitted via the OS file system is 2 KB, the size of the data for one stripe unit is 64 KB, and the size of data for one physical stripe (parity group) is 256 KB (=64 KB×4). The data block of the data to be written amounting to 2 KB is obtained by RAID speeding driver 100 and stored in the non-volatile memory 17. The RAID speeding driver 100 is a driver program for realizing a log-structured file system (LSFS).

Basically, at the time when a data block amounting to 256 KB (2 KB×128 data blocks) is stored in the non-volatile memory 17, the data of the data block are batch-written in a single physical stripe of the disk array 18 under the control of the RAID speeding driver 100. Since the RAID controller 16 can generate parities only from the written data block that amounts to 256 KB, it is no longer necessary to carry out an operation or reading old data for computationally determining parities so that the well known write-in penalties of RAID 5 can be reduced.

Built in the non-volatile memory is a controller for controlling the batch writing. Further, the non-volatile memory 17 is loaded with a log memory (data buffer for batch-writing) 171, an address conversion table 172, a physical stripe management table 173 and a logical stripe management table 272 as shown in FIG. 1.

The log memory 171 is a data buffer for storing data blocks to be written from the application. At the time when data blocks for a physical stripe is stores in the log memory 171, the operation of batch-writing them in the disk array 18 is started. In other words, a physical stripe constitutes a unit of "batch writing" and comprises a continuous region on a partition generated for the LSFS in the entire storage area of the disk array 18. Each physical stripe has a size equal to a stripe unit multiplied by an integer, the strip unit being held under the control of the RAID controller 16.

The address conversion table 172 is used for managing a relationship between the logical address for write-in data and the actual write-in position (physical address) on the disk array 18. In other words, the address conversion table 172 stores information for address conversion showing the relationship between each of a plurality of logical block numbers of the logical address space of the partition used for the LSFS and a corresponding physical block number indicating the physical position on the disk array 18 where the data block specified by the logical block number is found. The address management using the address conversion table 172 is performed in units of data blocks of a given size. More specifically, the logical block number of a block of write-requested data and the physical block number corresponding thereto are managed by the address conversion table 172 every block of the write requested data. The logical block number refers to the block number on the disk partition as viewed from the file system of the OS. The block number with which the OS file system requests for accessing is a logical address and hence is a virtual logical address. The logical block number is made to show correspondence to a physical block number (physical block number on a disk partition) by the address conversion table 172. The value of byte offset from the head position of the disk partition is determined by the physical block number multiplied by the block size (in bytes).

The address conversion table 172 has a plurality of entries that correspond to the respective logical block numbers. When a new data block is written, the physical block number (physical address) where the data block is actually written is registered as entry corresponding to the logical block number with which the write request is issued. When the data block is read, the physical block number corresponding to the logical block number with which the read request is issued is checked in the entries and the data block is read out from the physical position on the disk partition as specified by the physical block number (physical block number×block size).

The physical stripe management table 173 is used to control the information on each of generated physical stripes. The logical stripe management table 273 is used to control the information on each of generated logical stripes. The information on the logical stripes is utilized for the purpose of data rearrangement. A logical stripe is an aggregate of logical blocks obtained by cutting out part of the logical address space of a disk partition for a physical stripe from the heard thereof. Therefore, if a physical stripe contains ten physical blocks, a corresponding logical stripe also contains ten logical blocks.

As pointed out above, with write-in schematic of this embodiment, the data to be written randomly are batch-written in a physical stripe that is a continuous region. As a result, in view of a long time period, the written data are distributed among different physical stripes that are physically separated from each other if the regions where the data are written randomly are continuously arranged in the logical address space on the OS file system. Therefore, an attempt for sequentially reading the data that are written in separated physical stripes ends up with a random reading operation to make the efficiency of reading rather poor. It is therefore necessary to rearrange the data blocks periodically so that they are physically sequentially arranged in order to correct such a situation. This operation of data rearrangement or "rearranging data for the purpose of efficiently carrying out a sequential read operation" is referred to as repack processing here.

Figure 4:
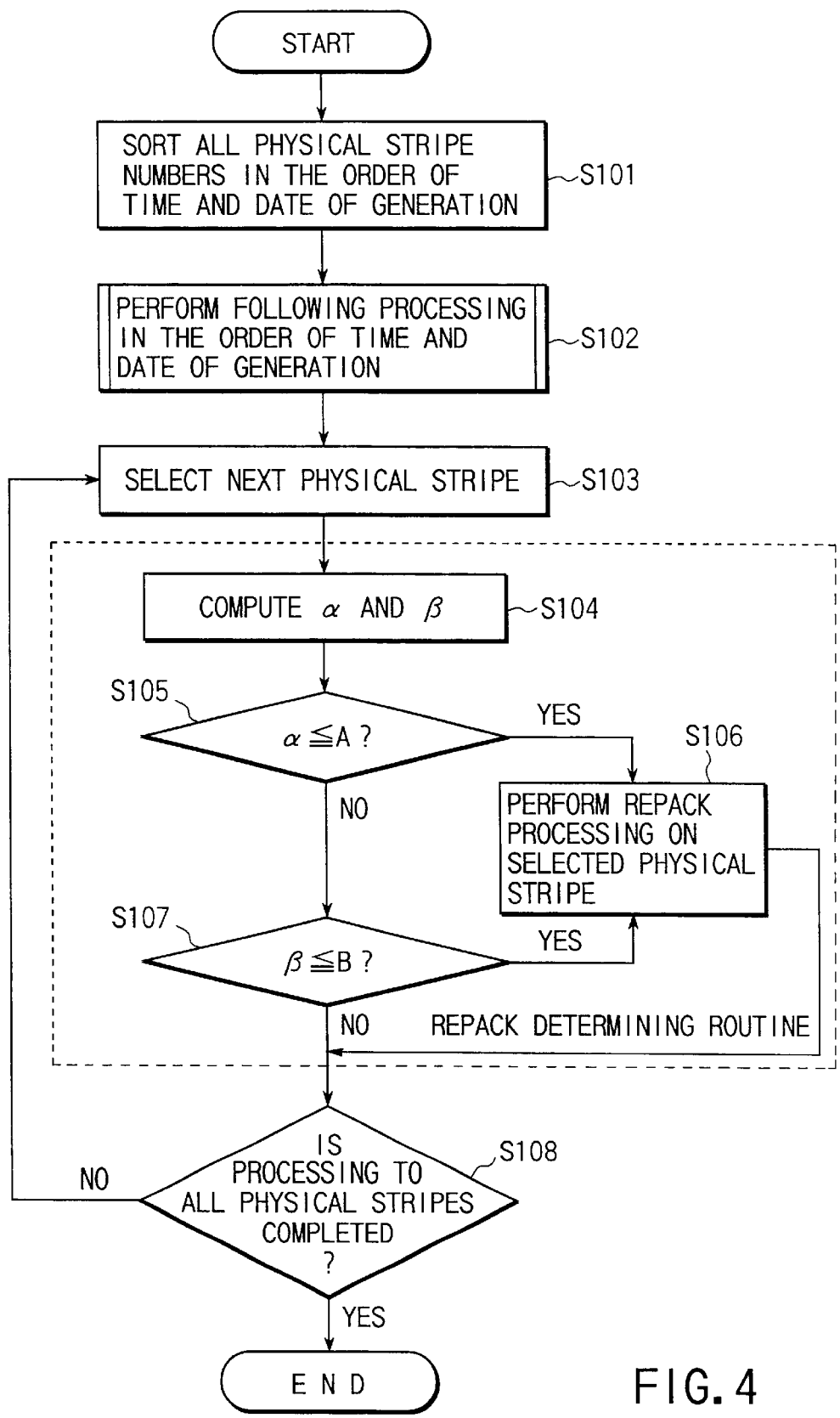
FIG. 4 is a flow chart of a repack control processing operation of a first embodiment that can be carried out in the computer system of FIG. 1.

Now, the method of controlling the repack processing of this embodiment will be described in detail by referring to FIGS. 3 and 4. FIG. 3 is a schematic illustration of physical stripes that can be used in the disk unit of the computer system and FIG. 4 is a flow chart of a repack control processing operation that can be carried out in the computer system.

With this embodiment, the physical stripes of the disk array are referenced sequentially in the order of time and date of generation to computationally determine the percentage ($=\alpha$) of valid blocks and the percentage ($=\beta$) of the consecutive logical address numbers of adjacently located logical blocks. Each of the physical stripes is determined to be selected as object of repack or not on the basis of the values of $\alpha$ and $\beta$.

Computation of $\alpha$ and $\beta$

Now, the computation of $\alpha$ and $\beta$ will be discussed by way of an example. FIG. 3 shows physical stripes, each comprising a total of ten data blocks. The numeral in each block indicates the logical block number of the block. The sign "–" indicates that the entry carrying the sign is an invalid block, which is a physical block where no valid data block is recorded. An invalid block may be a physical block where no data has ever been written or a physical block where the data block has been moved to some other physical stripe as a result of a repack processing operation or a new writing operation for the logical block.

Referring to FIG. 3, the number of valid blocks is 7 in the physical stripe No. 0 and hence the value of $\alpha$ of the physical stripe No. 0 is determined in a manner as shown below.

$$\alpha = 7/10 \times 100 = 70\%$$

The value of $\alpha$ represents the percentage of the capacity of the physical stripe selected as object of rearrangement that is being utilized. Thus, blocks with a small a value are mostly those that are wasting the resource and hence should be excluded from the objects of repack.

In the physical stripe No. 0, the logical block numbers 151 and 152 are arranged physically consecutively. Similarly, the logical block numbers 152 and 153, the logical block numbers 153 and 154 and the logical block numbers 13 and 14 are arranged physically consecutively. Therefore, four boundaries out of the nine boundaries of the blocks are continuously drawn. Thus, the value of β is determined by the formula below.

$$\beta = \frac{4}{9} \times 100 \approx 44\%$$

The value of β indicates the extent of continuity of the data blocks of the physical stripe selected as object of repack and a smaller value of β shows a greater extent of discontinuity and hence a poor efficiency for sequential read. Therefore, it is safe to determine that a physical stripe showing a small value of β should be selected as object of repack.

A time stamp TS in FIG. 3 is a sort of time indicating the position of the physical stripe in the group of physical stripes arranged in the order of time and date of generation. Judgments and processing operations for repack are conducted in the order of time and date of generation of the physical stripes. In other words, referring to FIG. 3, the physical stripes are determined and processed for repack in the order of physical stripe Nos. 0→2→1500→1→, ..., →3→, .... Therefore, it is possible to select a physical stripe generated earlier as object of repack with priority. From the viewpoint of locality of file systems, a physical stripe whose time and date of generation is old can be assumed to contain valid blocks that are hardly selected as objects of rewriting. In other words, a physical stripe with old time and date of generation may probably contain data blocks that are exclusively used for read and the efficiency of sequential read can be greatly improved by rearranging the data blocks contained in such a physical stripe. Additionally, the frequency of occurrence of a new writing operation can be minimized for the data collected by a repack processing operation and hence ineffective repack processing operations can be prevented from taking place by carrying out a repack operation for physical stripes whose time and date of generation is old.

Determination for Repack

Whether or not the physical stripe should be selected as object of repack is determined on the basis that "a physical stripe with α not greater than a predetermined value A should be selected as object of repack" (condition 1) or "a physical stripe with α not smaller than a predetermined value A and β not greater than a predetermined value B should be selected as object of repack" (condition 2). Assume that A=50% and B=50% here.

Then, the physical stripe No. 2 is determined as object of repack on the basis of the condition 1 because it contains valid blocks only to a small extent and hence the efficiency of using the disk is poor. Similarly, the physical stripes Nos. 0, 1 and 1500 are determined as objects of repack because they contain valid blocks to a satisfactory extent but the valid blocks are arranged poorly continuously. In other words, a physical stripe containing valid blocks to a certain extent that are not arranged continuously shows a poor efficiency for sequential read so that it should be selected as object of repack.

In reality, the values of α and β of each logical stripe change as the repack processing operation proceeds. Therefore, in this embodiment, the physical stripes selected as objects of repack are sequentially subjected to a repack processing operation on a one by one basis and the computation of α and β of the next physical stripe is conducted after the completion of the repack processing operation of the preceding physical stripe.

A First Embodiment of Sequence of Repack Control Processing

Now, the repack control processing operation of this embodiment will be described by referring to the flow chart of FIG. 4. This operation is carried out by the RAID high speeding driver 100 or its control driver.

Figure 5:
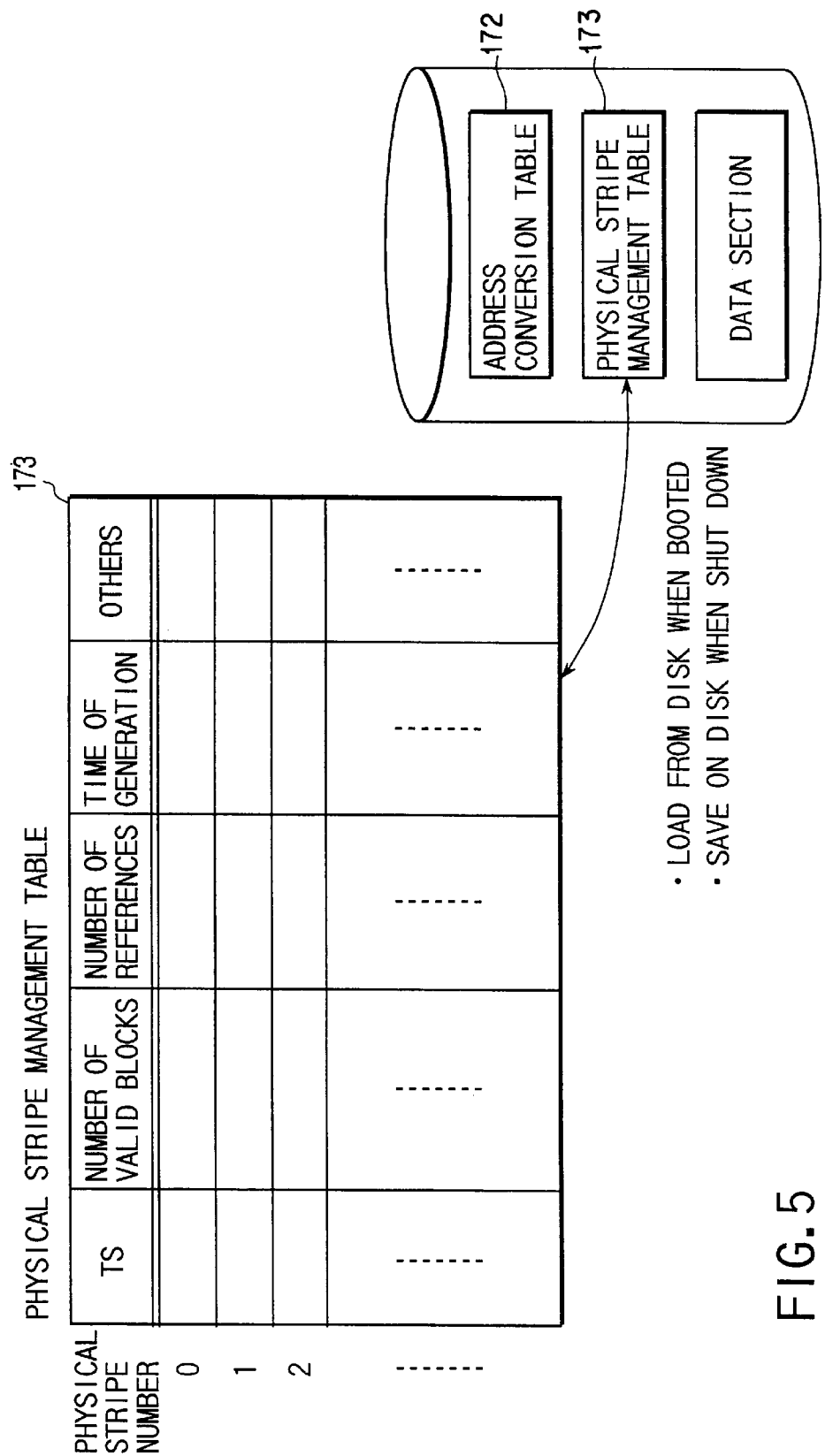
FIG. 5 is a schematic illustration of the physical stripe management table arranged in the computer system of FIG. 1.

Firstly, all the physical stripe numbers are sorted out in the order of time and date of generation (Step S101). This sorting operation can be conducted on the basis of the time stamps of the physical stripes described above. The time stamp TS of each physical stripe is managed for each physical stripe number by the physical stripe management table 173 along with the number of valid blocks, the number of times of references and the time and date of generation, as shown in FIG. 5. When the computer system is shut down, the physical stripe management table 173 is saved in a part of storage area within the logical disk drive along with the address conversion table 172. When the computer system is booted, on the other hand, it is loaded on each of the tables 172 and 173 in the non-volatile memory 17 from the logical disk drive.

Then, physical stripes are selected as objects of repack one by one in the order of time and date of generation on the basis of the result of the above sorting operation and a processing operation of determining each of the physical stripes to be selected as object of repack or not is carried out (Steps S102, S103).

Firstly, the values of α and β of the physical stripe that is selected first are computed (Step S104). If "α is not greater than the predetermined value A" (YES in Step S105), the current physical stripe is determined to be as object of repack and a repack processing operation is carried out for the physical stripe (Step S106). A repack processing operation is an operation of rearranging data blocks with consecutive logical block numbers so as to make them to be physically consecutively arranged and a new physical stripe is generated by using the blocks of the physical stripe being subjected to the repack processing operation and the blocks of other physical stripes. After the repack processing operations conducted on the selected physical stripes, it is determined whether or not each and every physical stripe is subjected to a processing operation of determining it to be selected as object of repack (Step S108) and the processing operation of determination is repeated on the remaining physical stripes in the order of time and date of generation until no physical stripe is left without being subjected to the processing operation of determination.

If, on the other hand, "α is greater than the predetermined value A" (NO in Step S105), it is determined whether or not β is not greater than the predetermined B (Step S107). If it is determined that "α is greater than the predetermined value β and 3 is not greater than the predetermined value B" (YES in Step S107), the current physical stripe is selected as object of repack and a repack processing operation is carried out to the physical stripe (Step S106).

No physical stripe whose "α is greater than the predetermined value A and β is also greater than the predetermined value B" is selected as object of repack. Then, it is determined whether or not each and every physical stripe is subjected to a processing operation of determining it to be selected as object of repack (Step S108) and the processing operation of determination is repeated on the remaining physical stripes in the order of time and date of generation until no physical stripe is left without being subjected to the processing operation of determination.

Figure 6:
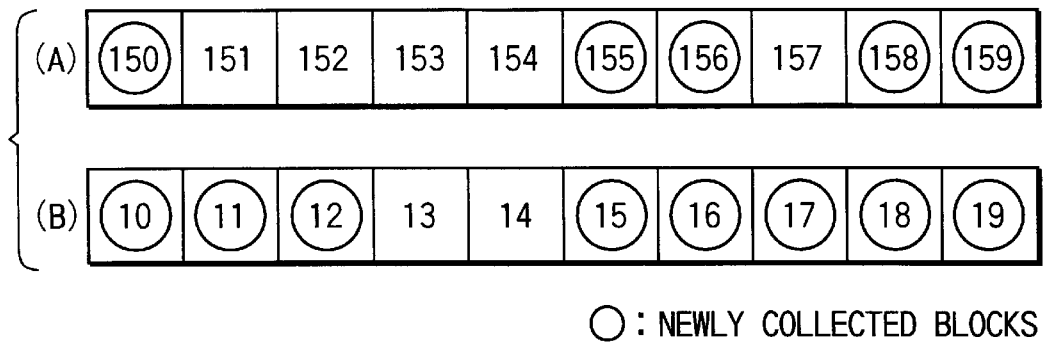
FIG. 6 is a schematic illustration of a result that can be produced by a repack processing operation of the computer system of FIG. 1.

FIG. 6 schematically illustrates the result of a repack processing operation conducted for the physical stripe with physical stripe No. 0 of FIG. 3. More specifically, in the case of FIG. 6, a pair of physical stripes (A) and (B) are newly generated as a result of the repack processing operation conducted on the physical stripe with physical stripe No. 0. Note than, the logical block numbers surrounded by a circle in FIG. 6 indicate data blocks collected from physical stripes other than the one with the physical stripe No. 0.

In a repack processing operation, all the data blocks do not necessarily have to be arranged in the order of logical address. Alternatively, it is be sufficient to form physical stripes so as to make they comprise data blocks showing consecutive logical addresses. The read performance of a disk array can be satisfactorily improved with such an arrangement.

Additionally, the condition of "selecting a logical stripe as object of repack if $\beta$ is not greater than a predetermined value," may be added and a logical stripe may be selected as object of repack simply on the basis of the value of $\beta$.

A Second Embodiment of Sequence of Repack Determination Processing

Figure 7:
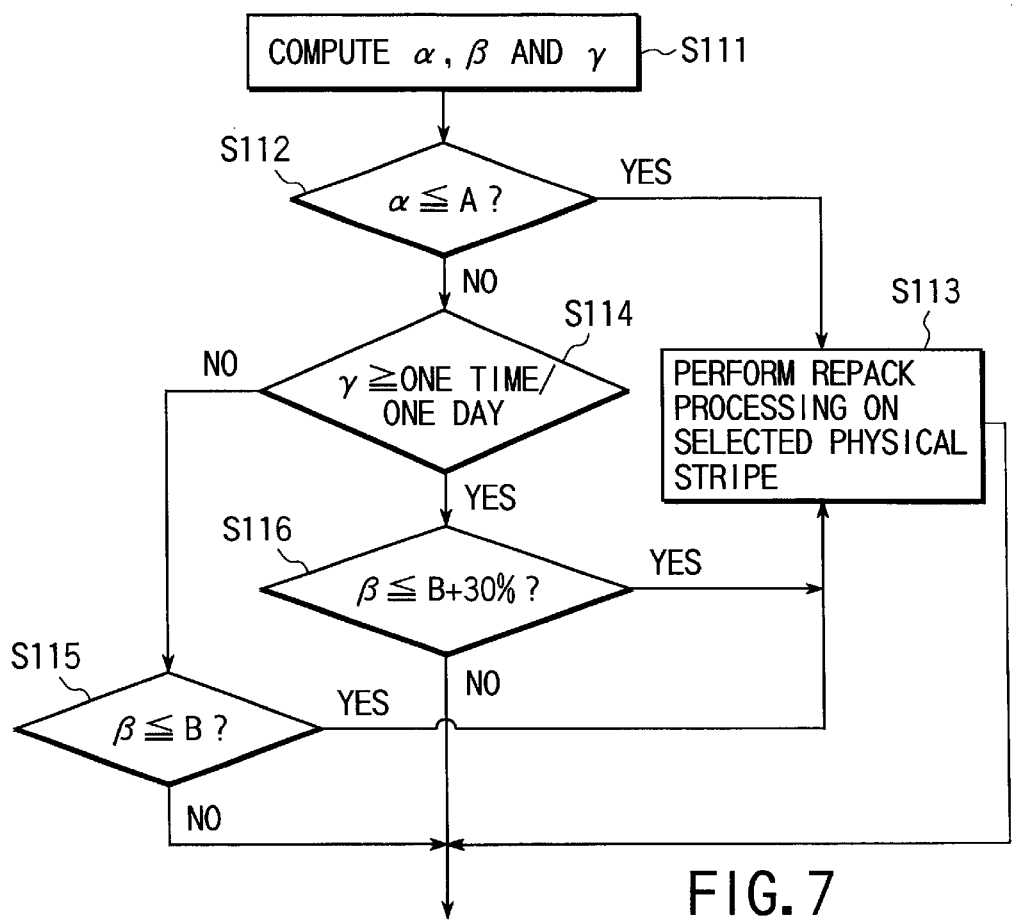
FIG. 7 is a flow chart of a repack judgment a processing operation of a second embodiment that can be carried out in the computer system of FIG. 1.

A second embodiment of sequence of repack determination processing will be described by referring to the flow chart of FIG. 7. "$\gamma$" is used in addition to the above $\alpha$ and $\beta$ in this example to refer to the number of times of references of a physical stripe per unit time after the generation thereof. As described above, the time and date of generation and number of times of references of each physical stripe are managed by the physical stripe management table 173 so that the value of $\gamma$ can be computationally determined on the basis of the table.

$\gamma$=number of times of references/(current time time−of generation)

If, for instance, the value of $\gamma$ is greater than once a day, there may be carried out a processing operation of increasing the value of B by 30%. As a result, "while a physical partition is normally determined to be in need of repack processing operation if the continuity is not greater than 50%, it will be determined to need a repack processing operation when the continuity is not greater than 80% if it is accessed once or more than once per day".

Thus, in this example, physical stripes are selected as objects of repack one by one in the order of time and date of generation on the basis of the result of a sorting operation and a processing operation of determining each of the physical stripes to be selected as object of repack or not is carried out in a manner as described below. Firstly, the values of $\alpha$, $\beta$ and $\gamma$ of the physical stripe that is selected first are computed (Step S111). If "$\alpha$ is not greater than the predetermined value A" (YES in Steps S112), the current physical stripe is determined as object of repack and a repack processing operation is carried out for the physical stripe (Step S113).

If "$\alpha$ is greater than the predetermined value A" (NO in Steps S112), it is determined whether or not the physical strip has a large number of times of reads depending on whether or not $\gamma$ is not smaller than once a day (Step S114). If the physical stripe is determined to be one with a small number of times of reads, it is subjected to a repack processing operation (Step S113) provided that "$\alpha$ is greater than the predetermined value A and $\beta$ is not greater than the predetermined value B (=50%)" (Step S115). On other hand, if the physical stripe is determined to be one with a large number of times of reads, it is subjected to a repack processing operation (Step S113) provided that "$\alpha$ is greater than the predetermined value A and $\beta$ is not greater than 80%" (Step S116) by changing the criterion for determining the continuity of data blocks. As a result, it is now possible to rearrange data blocks that are frequently read with priority to make them show continuous physical storage areas so that they can be accessed sequentially and efficiently for frequent read operations.

A Third Embodiment of Sequence of Repack Judgment Processing

A third embodiment of sequence of repack determination processing will be described by referring to FIGS. 8A through 8C and 9.

"$\epsilon$" is used in addition to the above $\alpha$ and $\beta$ in this example to refer to the extent of concentration of logical block numbers that are close to each other in a physical stripe. More specifically, an aggregate of valid blocks is formed for each logical stripe number corresponding to the logical block numbers of a physical stripe and the number of elements of any of the aggregates that is largest is defined as $\epsilon$. If the value of $\epsilon$ of a physical stripe is not greater than a predetermined value, the physical stripe is selected as object of repack with priority.

The "logical stripe number" is obtained by the formula of (the logical block number)/(the number of data blocks in a physical stripe) (rounding off the decimal of the quotient, if any, to make the quotient an integer).

Now the method of obtaining the logical block number will be described by way of an example.

Figure 8A:
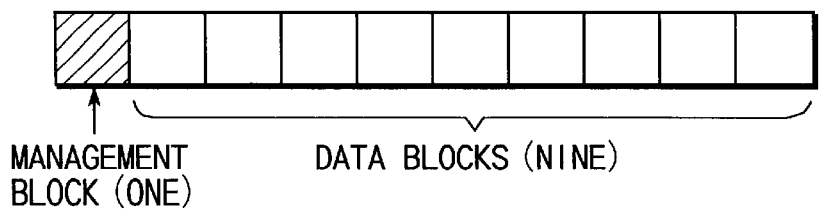
FIGS. 8A through 8C are schematic illustrations of relationships between physical stripes and logical stripes in the computer system of FIG. 1.

In reality, a physical stripe may contain a block to be used for management. In FIG. 8A, a physical stripe is assumed to contain nine data blocks and a management block. The management block typically stores information on the time stamps of the physical stripe, the positions of the valid blocks, the arrangement of the logical blocks and so on. A management block is provided in each physical stripe so that any of the data in the physical stripe may be accessed by using only the information stored in the physical stripe.

Figure 8B:
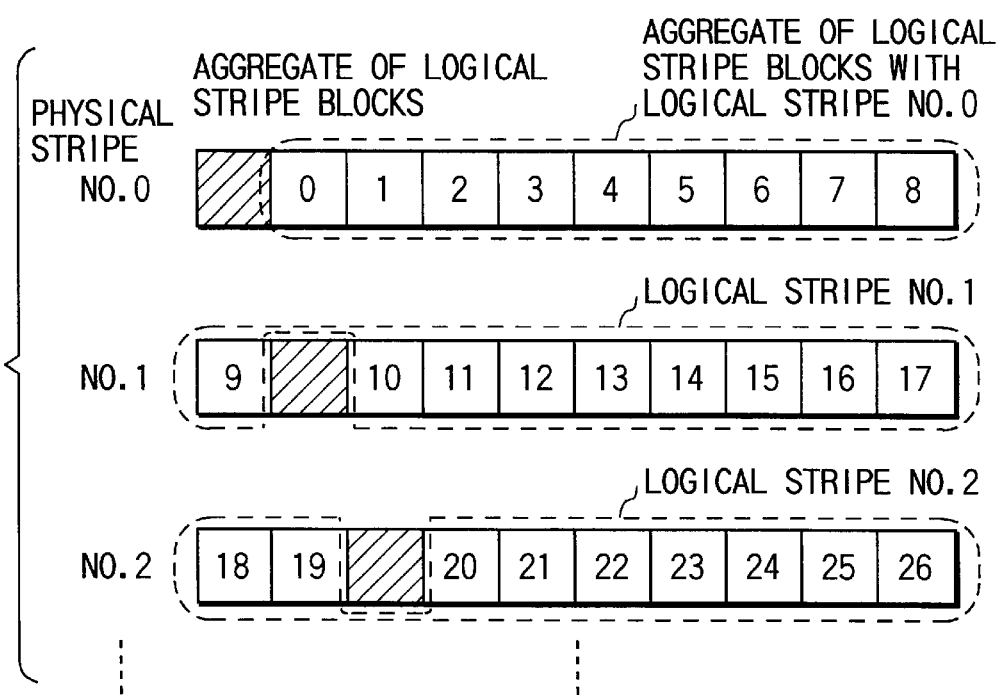

Assume that data blocks are arranged in the order of logical block number from the head of the physical stripe No. 0 (FIG. 8B). Also assume that the physical block numbers 0 through 8 contained in the physical stripe No. 0 are contained in the logical stripe No. 0 (and hence belong to the aggregates of logical stripe blocks). As pointed out above, the logical stripe number is obtained by the formula of (the logical block number)/(the number of data blocks in a physical stripe) (rounding off the decimal of the quotient, if any, to make the quotient an integer). If the logical block number is 14, then the logical stripe number will be 14/9=1.

Now, $\epsilon$ is determined by computation in a manner as described below.

Figure 8C:
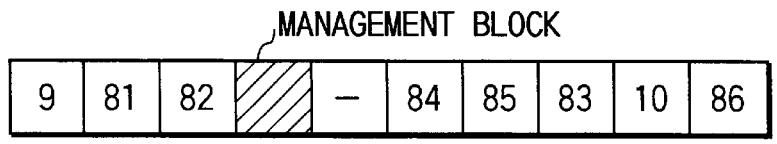
Figure 8C:
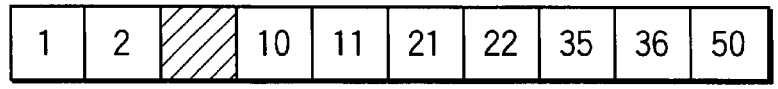

Assume here that $\epsilon$ is determined for the physical stripe No. 79 in FIG. 8C. Firstly, the logical stripe number of each data block of physical stripe No. 79 is obtained in a manner as follows.

The physical stripe number is 1 (=9/9, 10/9) for the logical block numbers 9 and 10.

The physical stripe number is 9 (=81/9, . . . , 86/9) for the logical block numbers 81, 82, 84, 85, 83 and 86.

Therefore, $\epsilon$ is made equal to six, or $\epsilon$=6, which is the number of elements belonging to the logical stripe with the logical stripe number of 9.

In other words, the physical stripe No. 79 is determined to contain the largest number of data blocks belonging to the logical stripe with the logical stripe number 9.

Similarly, $\epsilon$ of physical stripe No. 80 is made equal to two, or $\epsilon=2$.

$\epsilon$ represents the value indicating the extent of concentration of logical block numbers that are close to each other in a physical stripe. If the value of $\epsilon$ is small, the physical stripe is selected as object of repack. For example, "a physical stripe may be selected as object of repack if the value of $\epsilon$ is smaller than 5."

Figure 9:
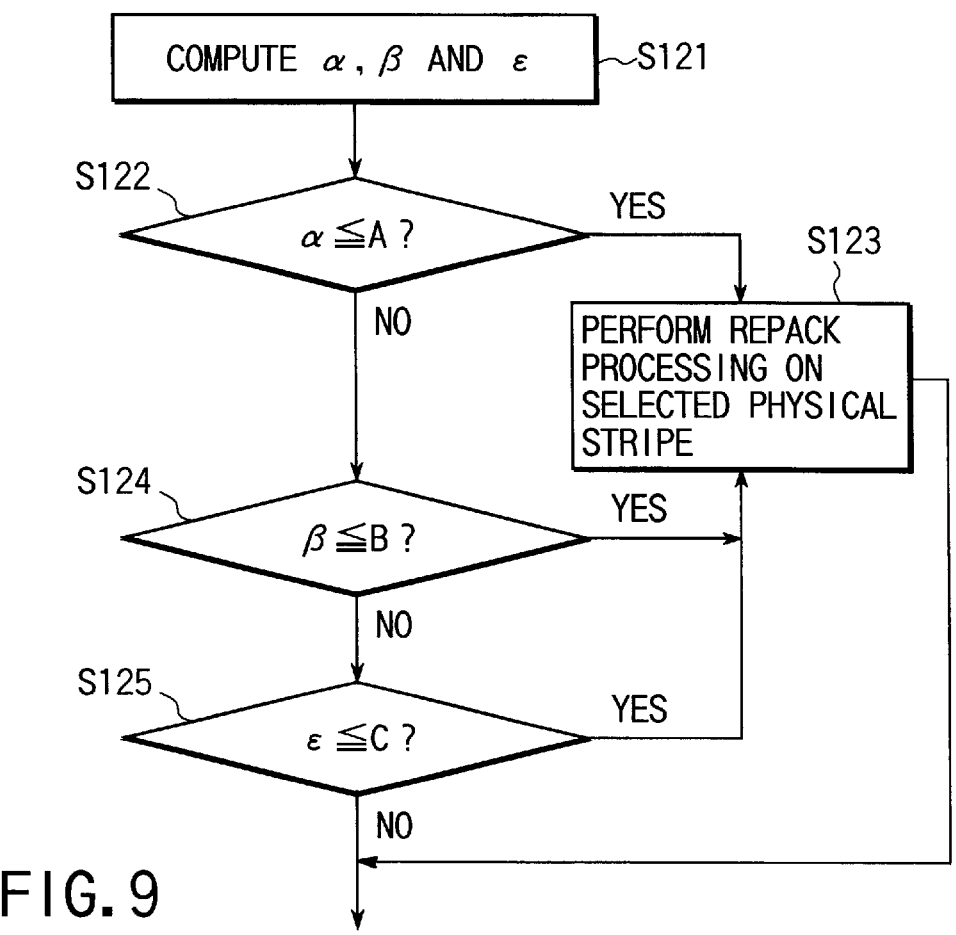
FIG. 9 is a flow chart of a repack judgment processing operation of a third embodiment that can be carried out in the computer system of FIG. 1.

FIG. 9 shows the sequence of repack determination processing of this embodiment.

In this embodiment, again, physical stripes are selected as objects of repack one by one in the order of time and date of generation on the basis of the result of a sorting operation and a processing operation of determining each of the physical stripes to be selected as object of repack or not is carried out in a manner as described below. Firstly, the values of $\alpha$, $\beta$ and $\epsilon$ of the physical stripe that is selected first are computed (Step S121). If "$\alpha$ is not greater than the predetermined value A" (YES in Steps S122), the current physical stripe is determined as object of repack and a repack processing operation is carried out for the physical stripe (Step S123).

If "$\alpha$ is greater than the predetermined value A" (NO in Steps S122), the physical stripe is subjected to a repack processing operation (Step S123) as shown in FIG. 4 provided that "$\alpha$ is greater than the predetermined value A and $\beta$ is not greater than the predetermined value B" (YES in Step S124).

If neither of the above two conditions is satisfied, the physical stripe is subjected to a repack processing operation (Step S123) under the condition wherein $\epsilon$ is not more than a predetermined value C (YES in Step S125).

In this example, again, it may be so arranged that, if the value of $\gamma$ is greater than once a day, there may be additionally carried out a processing operation of increasing the value of B by 30%. Alternatively, only $\epsilon$ may be used for determining a physical stripe as object of repack.

Repack Processing

Now, the sequence of a repack processing operation to be conduced on a physical stripe determined as object of repack will be described below by referring to FIG. 10.

Figure 10:
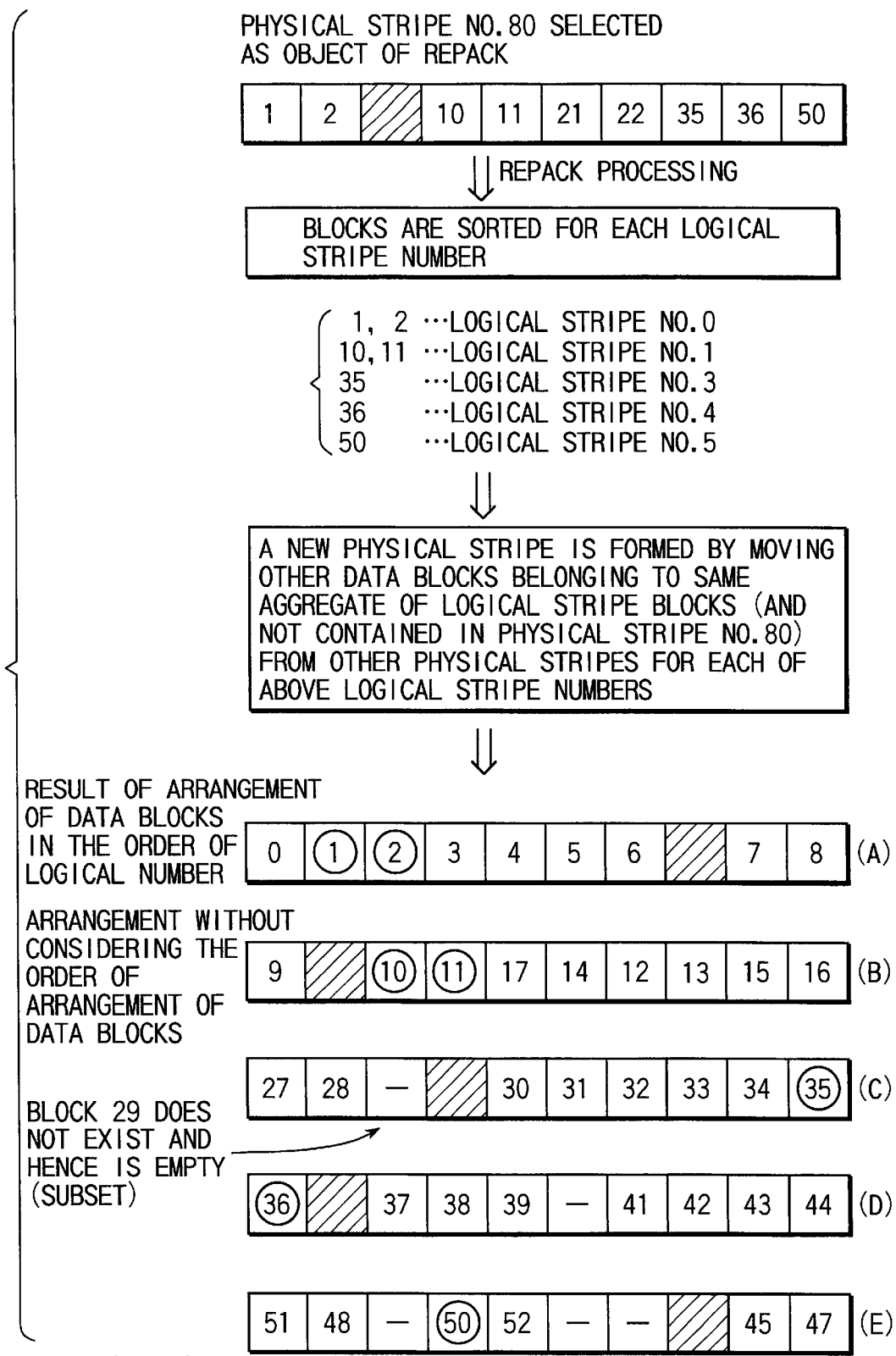
FIG. 10 is a schematic illustration of a repack processing operation that can be carried out in the computer system of FIG. 1.

Referring to FIG. 10, when carrying out a repack processing operation on the physical stripe No. 80, each of the data blocks of the physical stripe No. 80 is referenced to obtain an aggregate of logical stripe blocks out of the data blocks. An aggregate of logical stripe blocks refers to an aggregate of logical blocks (numbers) contained in a physical stripe when the data blocks are written from the head of the partition in the order of logical block number.

As for the data blocks of the logical blocks with the logical blocks Nos. 1 and 2, other logical blocks Nos. 0, 3, 4, 5, 6, 7 and 8 belonging to the aggregate of logical stripe blocks of the logical stripe No. 0 are moved from other physical stripes, to form a new physical stripe, or physical stripe (A), as shown in FIG. 10. Note that the logical block numbers surrounded by a circle in FIG. 10 denote the logical blocks that are found there from the very beginning.

Similarly, as for the logical blocks of Nos. 10 and 11, other logical blocks of Nos. 9, 17, 14, 12, 13, 15 and 16 belonging to the aggregate of logical stripe blocks of the logical stripe 1 are moved from other physical stripes, to form a new physical stripe, or physical stripe (B), as shown in FIG. 10.

A similar processing operation is conducted for the combinations of the logical blocks of Nos. 21 and 22 and the logical blocks of Nos. 35 and 36 and the logical block of No. 50. FIG. 10 shows the physical stripe (C) formed as a result of the processing operation conducted on the logical block of No. 35, the physical stripe (D) formed as a result of the processing operation conducted on the logical block of No. 36 and the physical stripe (E) formed as a result of the processing operation conducted on the logical block of No. 50.

In reality, there may be data blocks that cannot be moved from other physical stripes. Such data blocks may include those that have never been written and hence do not exist as valid data in the partition and those that are excluded from the objects of repack as a result of a processing operation as will be described hereinafter. Such data blocks would not be moved to any new physical stripe. In the physical stripe (C) of FIG. 10, the data block with the logical data block number 29 is one that cannot be moved and hence indicated as empty.

When forming a new physical stripe, while simply packing data blocks belonging to an identical aggregate of logical stripe blocks in a new physical stripe will provide a considerable effect, the efficiency of sequential access to the data blocks will be further improved if the data blocks are arranged in the order of logical block number in the new physical stripe.

For instance, as for the data blocks of the logical blocks of Nos. 1 and 2, other logical blocks of Nos. 0, 3, 4, 5, 6, 7 and 8 belonging to the aggregate of logical stripe blocks of the logical stripe No. 0 are moved from other physical stripes, to form a new physical stripe, or physical stripe (A), as described above. Then, the efficiency of sequential access to the data blocks will be improved by arranging them in the order of 0, 1, 2, 3, 4, 5, 6, 7 and 8 as shown in the physical stripe (A) in FIG. 10.

When the repack processing operation for the physical stripe No. 80 is over, the physical stripe No. 80 becomes empty and hence can be used for a new session of batch writing.

As described above, operations of optimally rearranging data for each of the data blocks of the physical block selected as object of data rearrangement can be carried out collectively by arranging data blocks in a physical stripe on the basis of a unit of aggregate of logical stripe blocks. As a result, it is possible to form physical stripes that do not contain any logical blocks belonging to some other physical stripes. In other words, a situation where an identical logical block is moved for a plurality of times in an operation of rearranging data can be effectively avoided to improve the efficiency of the operation.

Processing for Exclusion from Objects of Repack

Now, the processing operation of excluding a physical stripe that has survived only for a period not greater than a predetermined period of time from the objects of move will be discussed below. The data blocks of a physical stripe that was generated only recently may have been written frequently. If such data blocks are selected as objects of rearrangement, it is quite possible that they are moved to some other physical stripe as a result of a subsequent write operation so that such a repack will not only be useless but also reduce the efficiency of repack. Therefore, in this embodiment, any physical stripes that have survived only for a period not greater than a predetermined period of time are excluded from the objects of move.

Figure 11:
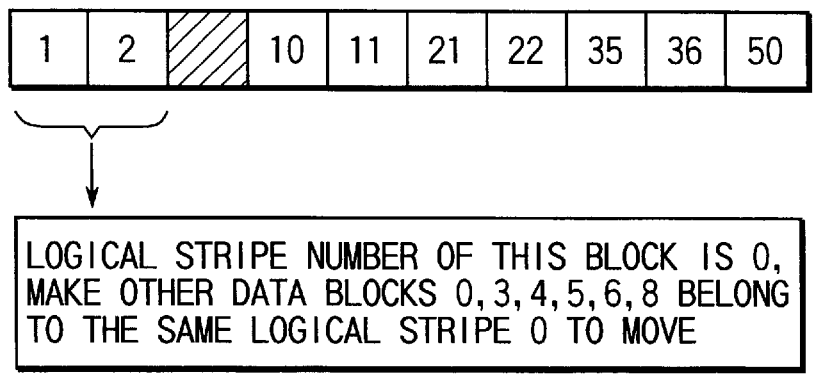
FIG. 11 is a schematic illustration of data blocks in a physical stripe selected as object of repack and an aggregate of blocks of logical stripes to which the data blocks belong in the computer system of FIG. 1.

Assume here that the physical stripe No. 80 shown in FIG. 11 is selected as object of repack. While every data block will be referenced, assume that attention is paid to the logical block numbers 1 and 2. Then, the number of the logical stripe they belong is 0 and the remaining blocks belonging to the aggregate of the logical stripe with the logical stripe number of 0 are Nos. 0, 3, 4, 5, 6, 7 and 8. Therefore, the period of time for which the physical stripe of No. 80 has survived is determined by referring to the time and date of generation of the physical stripe that contains these blocks.

If the reference value T for the period of survival to be used for determining whether or not a physical stripe should be selected as object of repack is 24 H and the period of survival of the blocks 0, 3 and 4=27 H,
the period of survival of the blocks 5, 6, and 7=22 H and
the period of survival of the block 8=48 H.

Figure 13:
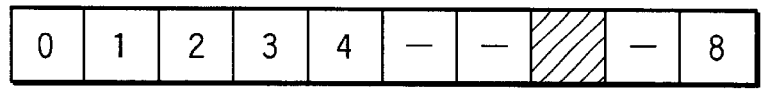
FIG. 13 is a schematic illustration of a result that can be produced by a repack processing operation of the computer system of FIG. 1.

In this case, since the blocks 5, 6 and 7 are not more than the reference value T (=24 H), they are excluded from the objects of repack and a new physical stripe is formed by using the blocks of Nos. 0, 1, 3, 4 and 8 as shown in FIG. 13.

Figure 12:
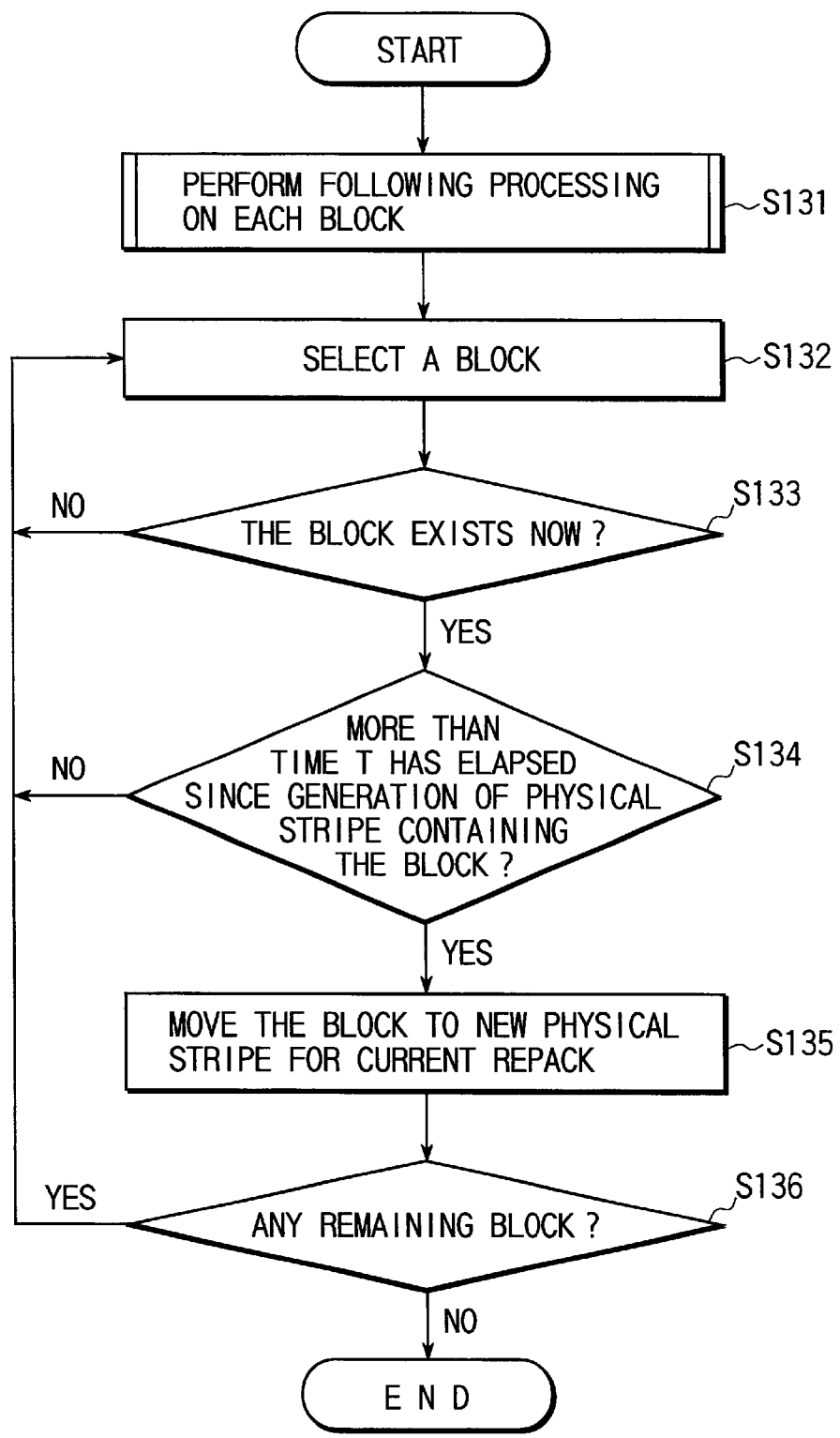
FIG. 12 is a flow chart of a repack processing operation that can be carried out in the computer system of FIG. 1.

The sequence of the operation of forming a new physical stripe will be described below by referring to the flow chart of FIG. 12.

Firstly, a block is selected from the remaining blocks (that are not found in the physical stripe selected as object of repack) that belong to the aggregate of logical stripe blocks (Steps S131, S132) and it is determined whether or not the block is currently found on the logical disk (Step S133). If not (NO in Step S133), the block is not moved and a next block is selected.

If, on the other hand, the block is currently found on the logical disk (YES in Step S133), it is determined whether or not the physical stripe containing the block has survived for a period not smaller than a reference value T (Step S134). If the period of survival is smaller than the reference value T (NO in Step S134), the block is not moved and a next block is selected. If, on the other hand, the period of survival is not smaller than T (YES in Step S134), the block is moved to a new physical stripe for the repack (Step S135). Then, it is checked whether or not any block that can be moved is remaining (Step S136) and, if there remains at least a block that can be moved, the steps from Step S132 on are repeated.

While a physical stripe that has not survived for a predetermined period of time is excluded from the objects of move in the above example, it may alternatively be so arranged that physical stripes that are generated relatively recently are excluded from the objects of repack to completely eliminate the processing operation of selecting physical stripes that are excluded from the objects of repack.

Rearrangement of blocks on the basis of the unit of physical stripe

Now, the processing operation of moving all the blocks of a physical stripe whose average value of β is determined to be higher than a reference value to the region with the physical stripe number where the blocks should be found.

Figure 14:
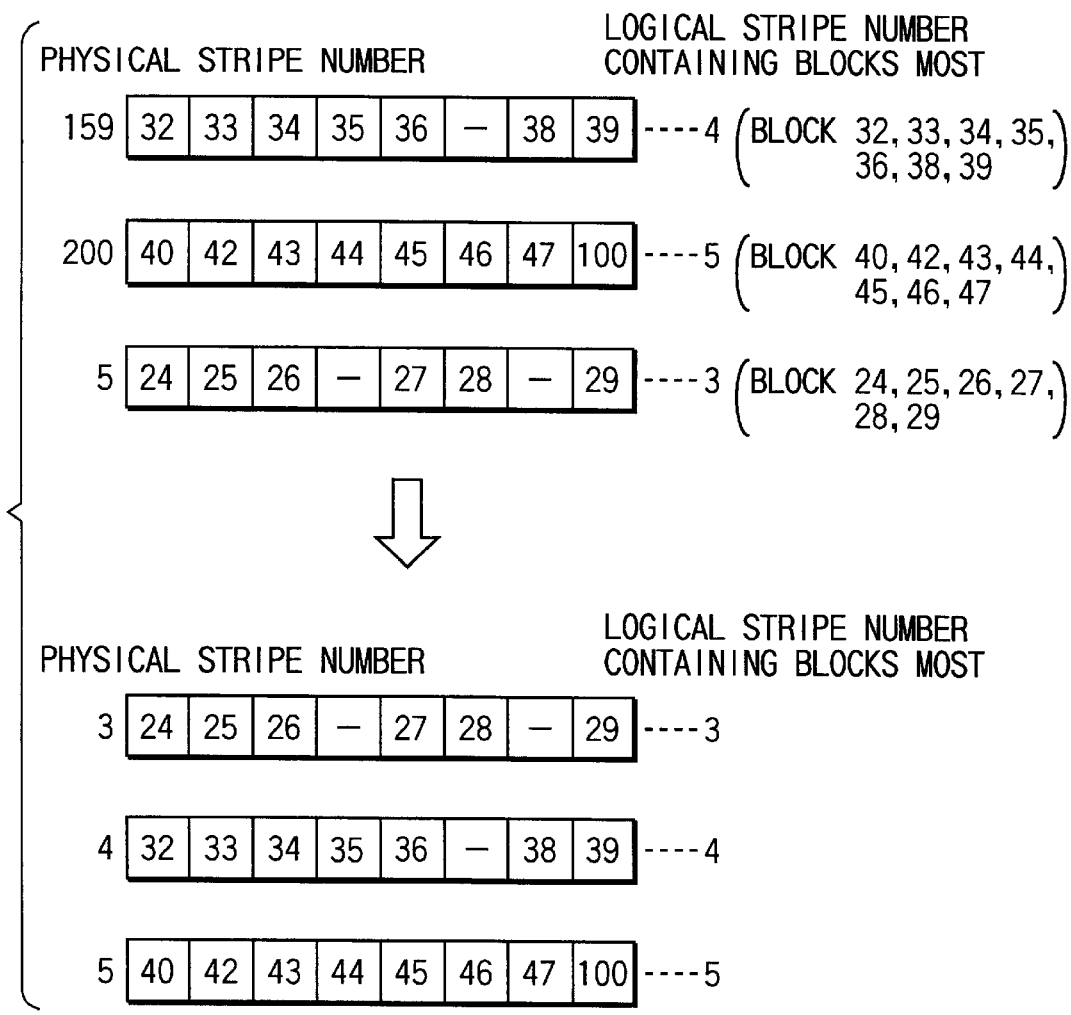
FIG. 14 is a schematic illustration of a rearrangement processing operation that can be carried out in the computer system of FIG. 1 on the basis of the unit of physical stripe.

Assume that the three physical stripes of Nos. 159, 200 and 5 in FIG. 14 are selected as objects. Firstly, aggregates of blocks are formed for each physical stripe on the basis of the physical stripe number and the logical stripe number of the logical stripe containing blocks most is determined.

Referring to FIG. 14, the physical stripe of No. 159 contains the logical blocks of Nos. 32, 33, 34, 35, 36, 38 and 39 and the number of the logical stripe where they should be found is 4 (in this example, since 1 stripe includes 8 blocks, 8 is used in denominator for calculation (fractions below the decimal point are rounded off)). Similarly, the logical stripe number of the logical stripe where the blocks of the physical stripe No. 200 should be found is 5 and that of the logical stripe where the blocks of the physical stripe No. 5 should be found is 3.

Therefore, each of the three physical stripes of Nos. 159, 200 and 5 are rearranged at respectively positions having the physical stripe numbers equal to the logical stripe numbers that are obtained above. Then, as a result, the data blocks of the logical stripes are arranged in the order of logical block number including the boundaries of the logical stripes to improve the continuity if compared with the data blocks before the rearrangement.

There with now be described fourth to sixth embodiments with reference to FIGS. 15 to 23. These embodiments can be realized by the hardware and software shown in FIGS. 1 and 2. Unlike the above embodiments, these embodiments use the logical stripe management table 272 in stead of the physical stripe management table 172. It is featured in the embodiments that data are rearranged so that the logical stripe numbers are successive to the physical stripe numbers, to optimize sequential reading.

Figure 16:
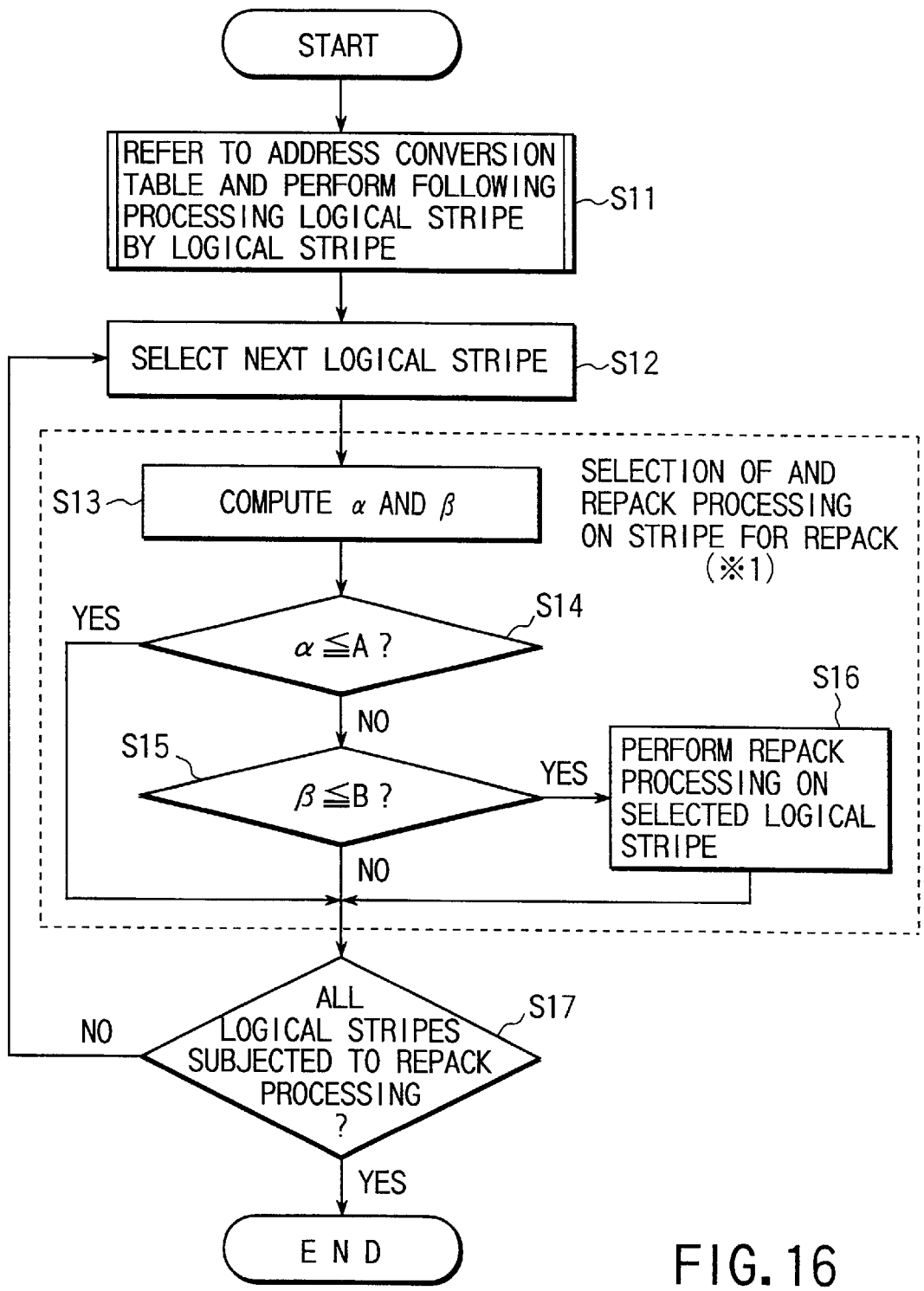
FIG. 16 is a flow chart of a repack control processing operation of a fourth embodiment that can be carried out in the computer system of FIG. 1.
Figure 17:
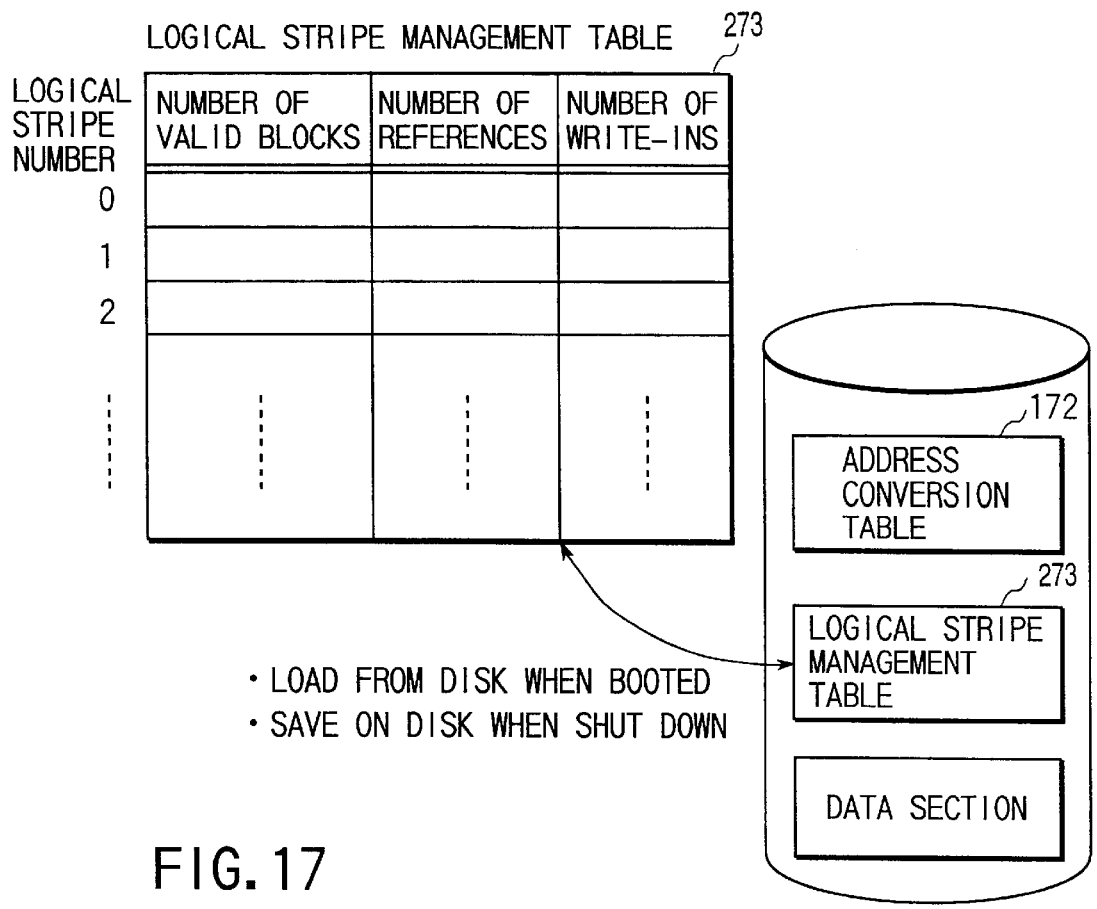
FIG. 17 is a schematic illustration of the logical stripe management table arranged in the computer system of FIG. 1.

Now, the method of controlling the repack processing of the fourth embodiment will be described in detail by referring to FIGS. 15 and 16. FIG. 15 is a schematic illustration of the address conversion table for controlling the repack processing that is arranged in the computer system of FIG. 1 and FIG. 16 is a flow chart of a repack control processing operation that can be carried out in the computer system of FIG. 1.

The address conversion table 172 of FIG. 15 is prepared by assuming that each physical stripe (and hence each logical stripe) comprises ten data blocks. The address conversion table 172 contains a large number of entries accompanied by respective logical block numbers that are used as indexes, each entry representing a registered physical block number. The sign "–" indicates that the entry carrying the sign is an invalid block (where no block has ever been written).

In the instance of the address conversion table 172 of FIG. 15, every ten logical blocks as counted from the head form a logical stripe. For example, logical stripe No. 0 comprises ten logical blocks with logical blocks Nos. 0 through 9 and logical stripe 1 comprises ten logical blocks of Nos. 10 through 19. Thus, if each physical stripe and hence each logical stripe comprises ten data blocks, the relationships of logical stripe number=logical block number/10 and
physical stripe number=physical block number/10,
where "/" represents a division of integers (rounding off the decimal of the quotient, if any).

Now, it will be seen by paying attention to the logical stripe No. 0 that the data blocks of the logical block of No. 0 are stored in the physical block of No. 30 (the leading block of the physical stripe No. 3) and the data blocks of the logical block of No. 1 are stored in the physical block of No. 31 (the second block of the physical stripe No. 3), while the data blocks of the logical block of No. 2 are stored in the physical block of No. 32 (the third block of the physical stripe No. 3) and the data blocks of the logical block of No. 3 are stored in the physical block of No. 33 (the fourth block of the physical stripe No. 3). Additionally, the data blocks of logical blocks of Nos. 6, 7 and 8 are stored respectively in the physical block of Nos. 133, 134 and 237. The logical blocks of Nos. 4, 5 and 9 are invalid blocks.

In this way, by referring to the address conversion table 172, it is possible to find out the extent of physical distribution of the logical blocks of each logical stripe. Thus, with this embodiment, the percentage (=α) of valid blocks and the percentage (=β) of the consecutive logical address numbers of adjacently located logical blocks are computationally determined for each logical stripe by checking the physical block numbers of the logical blocks of the logical stripe. If the logical stripe is selected as object of repack or not is determined on the basis of the values of α and β.

Computation of α and β

Now, the computation of α and β will be discussed by way of an example. Referring to FIG. 15, the number of valid blocks is 7 in the logical stripe No. 0 and hence the value of α of the logical stripe is determined in a manner as shown below.

$$\alpha = 7/10 \times 100 = 70\%$$

The value of α represents the percentage of the capacity of the logical stripe selected as object of rearrangement that is being utilized. Thus, blocks with a small α value are mostly those where data are not written to a large extent and hence can be excluded from the objects of repack (because they do not have many blocks that will be rearranged if repacked and hence they will not provide any remarkable effect of repack).

In the logical stripe No. 0, the physical block numbers corresponding to the logical blocks Nos. 0, 1, 2 and 3 and the physical blocks corresponding to the logical blocks Nos. 6 and 7 are arranged consecutively. Therefore, out of block boundaries, four are continuously drawn. Thus, the value of β is determined by the formula below.

$$\beta = 4/9 \times 100 \approx 44\%$$

In a similar way, α=80% and β=22% are obtained for the logical stripe No. 1 and α=20% and β=0% are obtained for the logical stripe No. 2, whereas α=90% and β=44% are obtained for the logical stripe No. 3.

Determination for Repack

If the logical stripe should be selected as object of repack is determined on the basis that "a logical stripe with α not smaller than a predetermined value A and β not greater than a predetermined value B should be selected as object of repack" (condition 1). Assume that A=50% and B=50% here.

Then, the logical stripe No. 2 does not satisfy the above condition because its α is small and hence it is determined that it does not need any repack because "it contains only few invalid blocks and may not provided any remarkable effect of repack". On the other hand, the logical stripes Nos. 0, 1 and 3 satisfy the above condition and therefore they will be selected as objects of repack.

In reality, the values of α and β of each logical stripe change as the repack processing operation proceeds. Therefore, in this embodiment, the logical stripes selected as objects of repack are sequentially subjected to a repack processing operation on a one by one basis and the computation of α and β of the next logical stripe is conducted after the completion of the repack processing operation of the preceding logical stripe.

A Fourth Embodiment of Sequence of Repack Control Processing

Now, the repack control processing operation of this embodiment will be described by referring to the flow chart of FIG. 16. This operation is carried out by the RAID speeding driver 100.

Firstly, the address conversion table 172 is referenced in the order of index and the value of the physical block number in question is checked (Step S11). Then, logical stripes are sequentially selected in the ascending order of the value (Step S12) and the selected logical stripe is subjected to "a processing operation of selecting a stripe as object of repack and repacking it (*1)", which will be described below.

In a processing operation of selecting a stripe as object of repack and repacking it, firstly, the values of α and β of the logical stripe that is selected first are computed (Step S13). The number of valid blocks of each logical stripe is held under the control of the logical stripe management table 273 (shown in FIG. 17) along with the number of times of read references, the number of times of writes and other information. When the computer system is shut down, the logical stripe management table 273 is saved in a region different from the data region of the disk partition for the LSFS along with the address conversion table 172. When the computer system is booted, on the other hand, it is loaded on the non-volatile memory 17 from the disk partition. The value of α of a logical stripe can be computed on the basis of the number of valid blocks listed in the logical stripe management table 273 for the logical stripe. of course, the value of α can be easily determined by searching for the entries of the address conversion table 172 if the information of "-" indicating an invalid block is registered in the address conversion table 172 for each invalid block in a manner as described earlier.

If "α is not greater than the predetermined value A" (YES in Step S14), the current logical stripe is excluded from the objects of repack. If, on the other hand, "α is greater than the predetermined value A" (NO in Step S14), it is determined whether or not β is not greater than the predetermined B (Step S15). If it is determined that "α is greater than the predetermined value A and β is not greater than the predetermined value B" (YES in Step S15), the current logical stripe is selected as object of repack and a repack processing operation is carried out to the logical stripe (Step S16). A repack processing operation is an operation of rearranging data blocks with consecutive logical block numbers so as to make them to be physically consecutively arranged. In the repack processing operation, the data blocks of the logical stripe selected as object of repack are read out from the disk array 18 to the log memory 171 while an empty physical stripe is prepared on the partition of the disk array 18 so that the data blocks read out to the log memory 171 are batch-written in the order of logical block number.

Then, it is determined whether the processing operation is completed for all the logical stripes (Step S17) and the "processing operation of selecting a stripe as object of repack and repacking it" is conducted repeatedly in the index until no unprocessed logical stripe is found.

The above described repack control processing may be executed automatically and cyclically at regular intervals or in response to an explicit instruction of the manager of the system.

Figure 18:
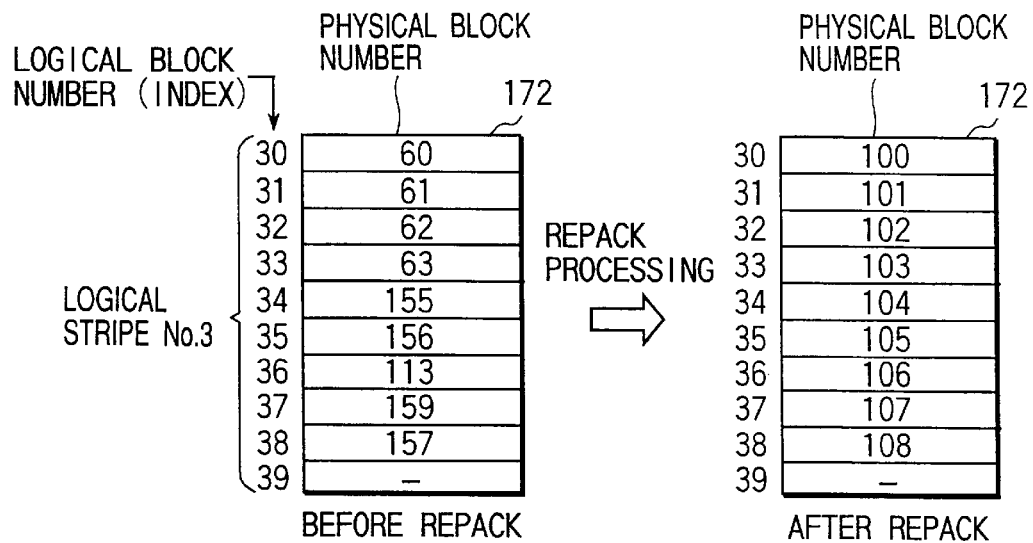
FIG. 18 is schematic illustration of the address conversion table, showing how it varies before and after a repack processing operation.
Figure 19:
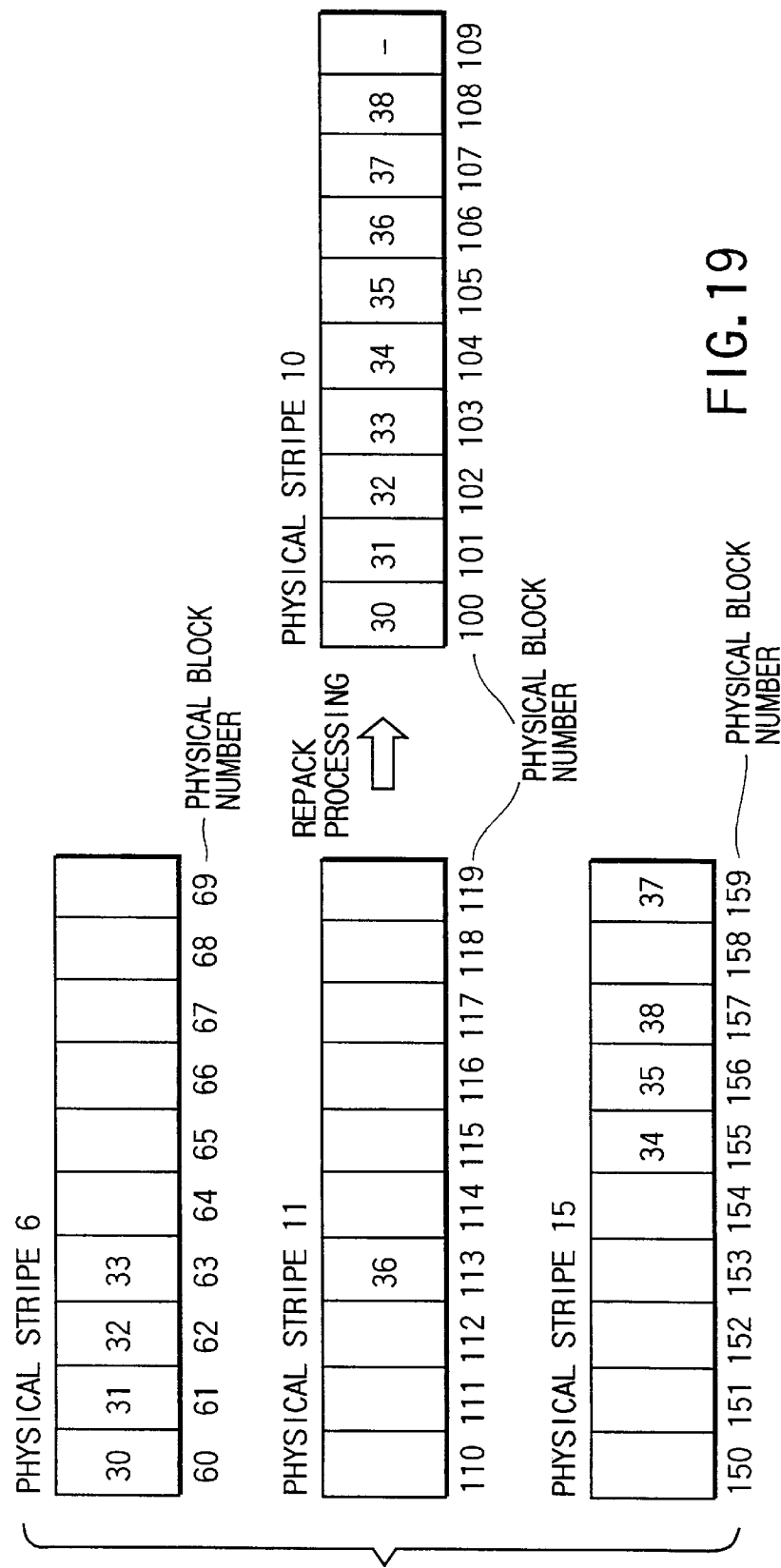
FIG. 19 is a schematic illumination of the physical arrangement of data, showing how it varies before and after a repack processing operation.

FIGS. 18 and 19 schematically illustrate the result of a repack processing operation conducted for the logical stripe No. 3 of FIG. 15. More specifically, FIG. 18 is schematic illustration of the address conversion table of FIG. 15, showing how it varies before and after a repack processing operation and FIG. 19 is a schematic illumination of the physical arrangement of data, showing how it varies before and after a repack processing operation.

Before the repack, the nine valid blocks (with logical blocks Nos. 30, 31, . . . , 38) in the logical stripe No. 3 are stored in three physical stripes (physical stripes Nos. 6, 11 and 15) in a distributed fashion. Note that numerals 30 through 38 in FIG. 19 refer to the respective data of the logical blocks with those logical block numbers. If the logical blocks Nos. 30 through 38 are to be read successively under this condition, the isolated three physical stripes Nos. 6, 11 and 15 have to be accessed at the cost of efficiency. Thus, a repack processing operation will be conducted on the logical stripe No. 3. Assume here that an empty physical stripe No. 10 is selected on the disk array 18. Then, the data of all the valid blocks of the logical stripe No. 3 are read out from the three physical stripes Nos. 6, 11 and 15 to the log memory 171 and then batch-written in the physical stripe No. 10. Note that all the nine valid blocks are arranged in the order of the logical blocks (Nos. 30, 31, . . . , 38) in the physical stripe No. 10. At the same time, the physical block numbers of the nine valid blocks (with the logical blocks Nos. 30, 31, . . . , 38) in the logical stripe No. 3 are updated (to Nos. 100, 101, . . . , 108). As a result of this repack processing operation, only the physical stripe No. 10 is accessed to sequentially read the logical blocks Nos. 30 through 38 so that consequently the access efficiency and hence the performance of the system for sequential read are greatly improved.

Additionally, as a result of generating a new physical stripe for each logical stripe selected as object of repack and rearranging the data blocks contained in the logical stripe of the object of repack in the order of logical block number, the physical arrangement of the data is made closer to the logical arrangement thereof. Still additionally, if the data blocks are arranged physically consecutively also in terms of logical stripe, the data blocks will show continuity at the boundaries of the physical stripes. While the data blocks are rearranged most preferably in the order of logical block number in a repack processing operation, the performance of the system for read can be improved significantly by simply containing all the data blocks of the logical stripe selected as object of repack in a single physical stripe.

Furthermore, the condition of "selecting a logical stripe as object of repack if β is not greater than a predetermined value B" may be added and a logical stripe may be selected as object of repack simply on the basis of the value of β.

Processing of Selecting a Stripe as Object of Repack on the Basis of the Number of Times of Read References Now, a fifth embodiment of the invention will be described in terms of repack processing by referring to FIGS. 20 and 21.

With this embodiment, the number of times of read references is controlled for each logical stripe and each and every logical stripe with the number of time of read references equal to or greater than a predetermined value is subjected with priority to a "processing of selecting a stripe as object of repack". The number of times of read references of a logical stripe refers to the number of times of read references after the last processing operation of selecting the logical stripe as object of repack. In other words, the number of times of read references is cleared and made equal to 0 each time when the logical stripe is subjected to a processing operation of selecting it as object of repack. The number of times of read references of a logical stripe that has never been selected as object of repack is "the number of times of read references since the generation of the partition".

Figure 20:
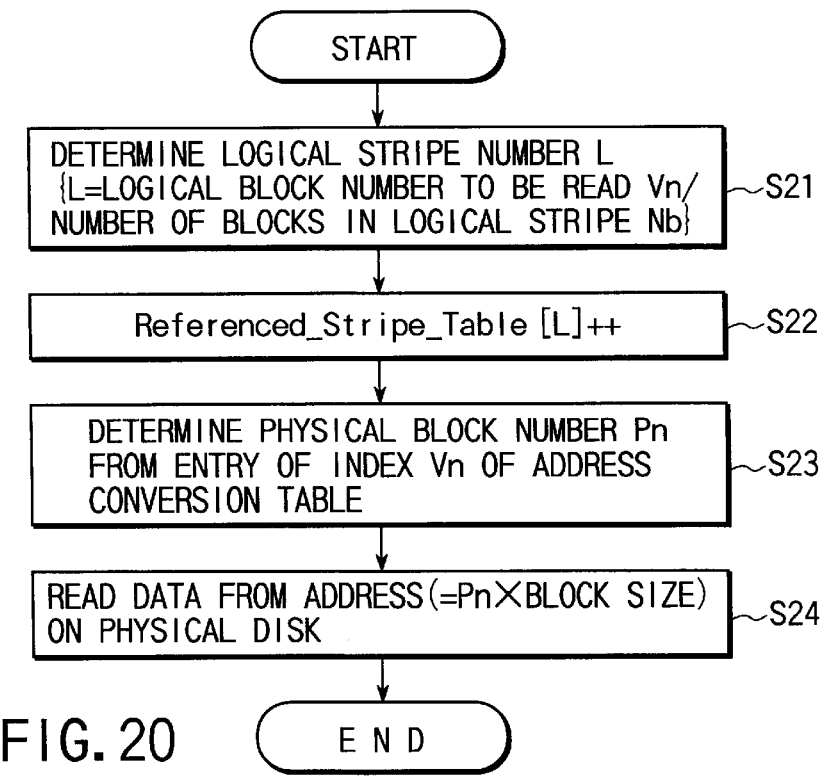
FIG. 20 is a flow chart of the processing operation for reading data of a computer system realized as a fifth embodiment of the invention.

FIG. 20 is a flow chart of the processing operation for reading data of a computer system realized as the fifth embodiment of the invention that is carried out by a RAID speeding driver 100.

Assume here that a read reference counter is provided for each logical stripe and the number of times of read references of each logical stripe is controlled by means of the read reference counter. Referenced_Stripe_Table [ ] refers to the table of "the read reference counter" showing "the read reference counter reading", using the logical stripe number as index. The read reference counter is initialized to 0 when at the time of the generation of the partition.

As shown in FIG. 20, at the time of reading a data block, the logical stripe number L of the logical block that the OS file system requests to be read is determined on the basis of the number of the logical block (Step S21). If the number of the logical block to be read is vn and the total number of blocks in each logical stripe is Nb, L is expressed by the equation below.

$$L=Vn/Nb$$

Then, the reading of the "read reference counter" of the logical stripe L to which the logical block belongs is incremented to Referenced_Stripe_Table [L]++ (Step S22). Thereafter, an ordinary read processing operation is carried out (Steps S23, S24). In other words, the physical block number Pn corresponding to the logical block number Vn is determined by referring to the address conversion table 172 (Step S23) and the data block is read out by way of the RAID controller 16 from the physical position on the disk partition as specified by the disk address that is supplied in terns of Pn×block size (Step S24).

Figure 21:
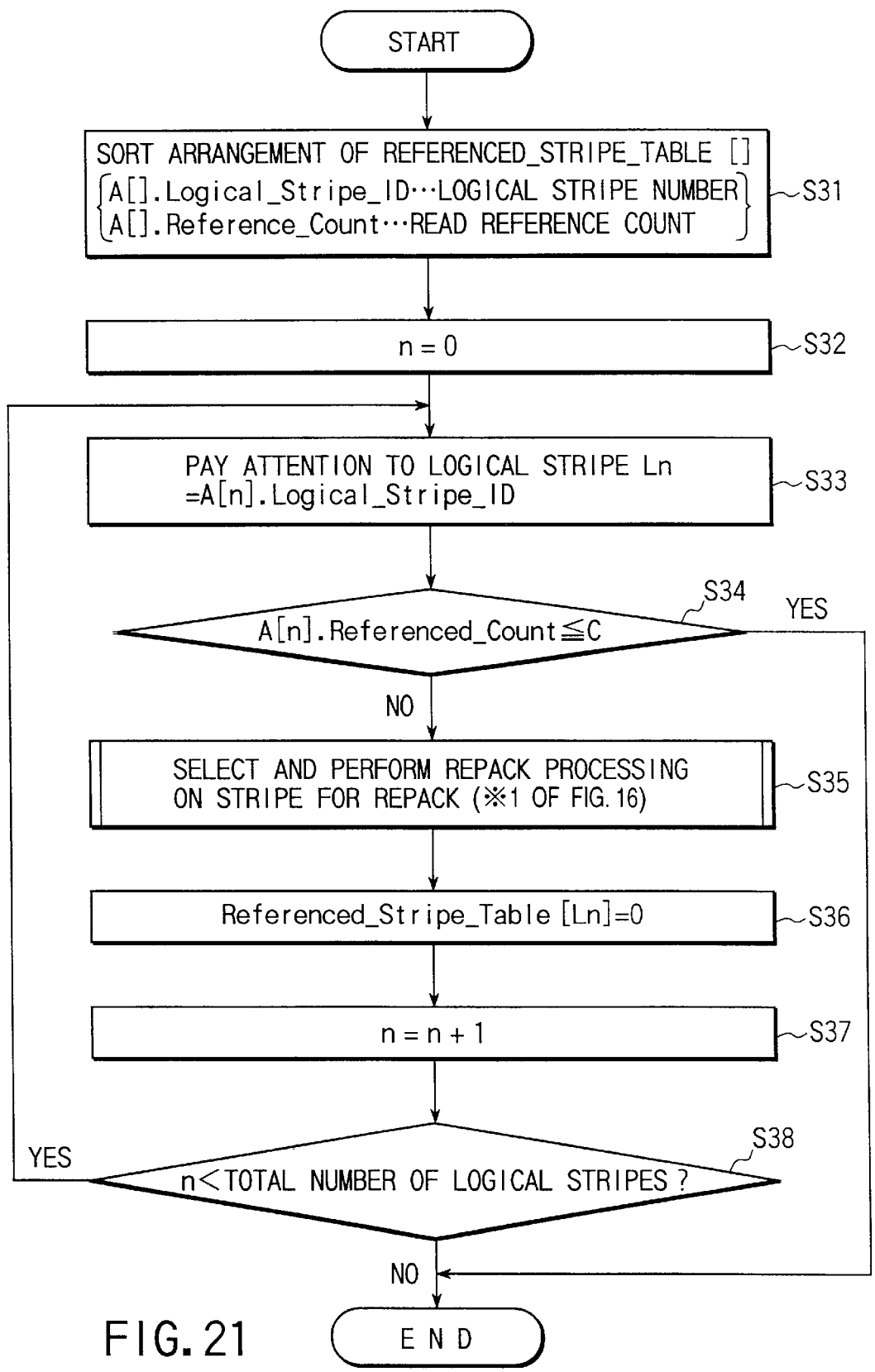
FIG. 21 is a flow chart of a second repack control processing operation that can be carried out in the computer system of FIG. 20.

FIG. 21 is a flow chart of the fifth repack control processing operation that can be carried out by the RAID speeding driver 100 of the computer system of FIG. 20 during the repack processing. While the contents of the address conversion table 172 were referenced in the order of index in FIG. 16, a "processing of selecting a stripe as object of repack" is carried out for each of the logical stripes showing a large number of times of read references by using Referenced_Stripe_Table [ ] along with α and β.

More specifically, firstly, the logical stripe numbers are rearranged in the descending order of "the read reference counter readings" so that a logical stripe showing a high read reference counter reading is selected as object of repack early (Step S31). In Step S31, a new array A [ ] is also formed. Each entry of the array A [ ] includes two members of Logical_Stripe_ID and Reference_Count and expressed as follows by using the C language.

A [ ]. Logical_Stripe_ID

A [ ]. Reference_Count

Note that A [ ]. Logical_Stripe_ID indicates the logical stripe number and A [ ]. Reference_Count indicates the number of times of read references. As the values registered in the Referenced_Stripe_Table [ ] are rearranged, the "read reference counter _reading" and the corresponding logical stripe number are respectively set in the above two members of the above array A in the descending order.

Thereafter, the entries are referenced in the order of registration in the array A [ ] and "the processing operation of selecting a stripe as object of repack and repacking it (operation as indicated by *1 in FIG. 16)" is carried out as long as there remains at least a logical stripe whose read reference counter "A[ ]. Reference_Count" shows a reading not smaller than a predetermined C. More specifically, n=0 is used and, by paying attention to the logical stripe (L0=A

[0]. Logical_Stripe_ID) showing the highest counter reading (Steps S32, S33), it is determined whether or not the read reference count (A [0]. Reference_Count) of the logical stripe is not greater than the predetermined value C (Step S34). If it is found that the read reference count is greater than the predetermined value C, the processing operation of selecting a stripe as object of repack and repacking it is carried out on the basis of the values of α and β (Step S35). The read reference counter of the logical stripe is cleared to 0 after the processing operation of selecting the stripe as object of repack regardless whether or not it is actually selected as object of repack (Step S36).

Thereafter, n+1 is used and, by paying attention to the logical stripe (L1=A [1]. Logical_Stripe_ID) showing the next highest counter reading (Steps S37, S38, S33), it is determined whether or not the read reference count (A [1]. Reference_Count) of the logical stripe is not greater than the predetermined value C (Step S34).

At the time when a logical stripe whose read reference count "A [n]. Reference_Count" is not greater than the predetermined value C is found (YES at Step S34), the processing operation is terminated. Thus, a logical stripe whose reading of the read reference counter is high can be selected with priority as object of repack. Additionally, the load of the processing operation of selecting the stripe as object of repack can be reduced because only the logical stripes whose reading of the read reference counter "A [ ]. Reference_Count) is greater than the predetermined value C are subjected to the processing operation.

Processing of Selecting Object of Repack on the Basis of the Number of Times of Write-ins Now, a sixth embodiment of the invention will be described in terms of repack processing by referring to FIGS. 22 and 23.

With this embodiment, the number of times for which the operation of writing data in the logical blocks of each logical stripe is repeated is controlled and logical stripes showing a number of times of write-ins not smaller than a predetermined value are subjected to a "processing operation of selecting a stripe as object of repack". The number of times of write-ins of each logical stripe refers to the number of times of write-ins after the last processing operation of selecting the logical stripe as object of repack. In other words, the number of times of write-ins is cleared and made equal to 0 each time when the logical stripe is subjected to a processing operation of selecting it as object of repack. The number of times of write-ins of a logical stripe that has never been selected as object of repack is "the number of times of write-ins since the generation of the partition".

A logical stripe can give rise to physical discontinuity when a write-in operation is conducted to any of its logical blocks because, with the LSFS, additional data are written on the basis of the unit of physical stripe and the old data blocks of some other physical stripe corresponding to those contained in the physical stripe that now carries the additional data are made invalid. Therefore, it is safe to assume that the physical positions of the logical blocks of a logical stripe showing a large number of times of write-ins are distributed to a large extent. Thus, the repack processing operation can be conducted efficiently by selecting logical stripes showing a large number of times of write-ins as candidates for the operation.

Figure 22:
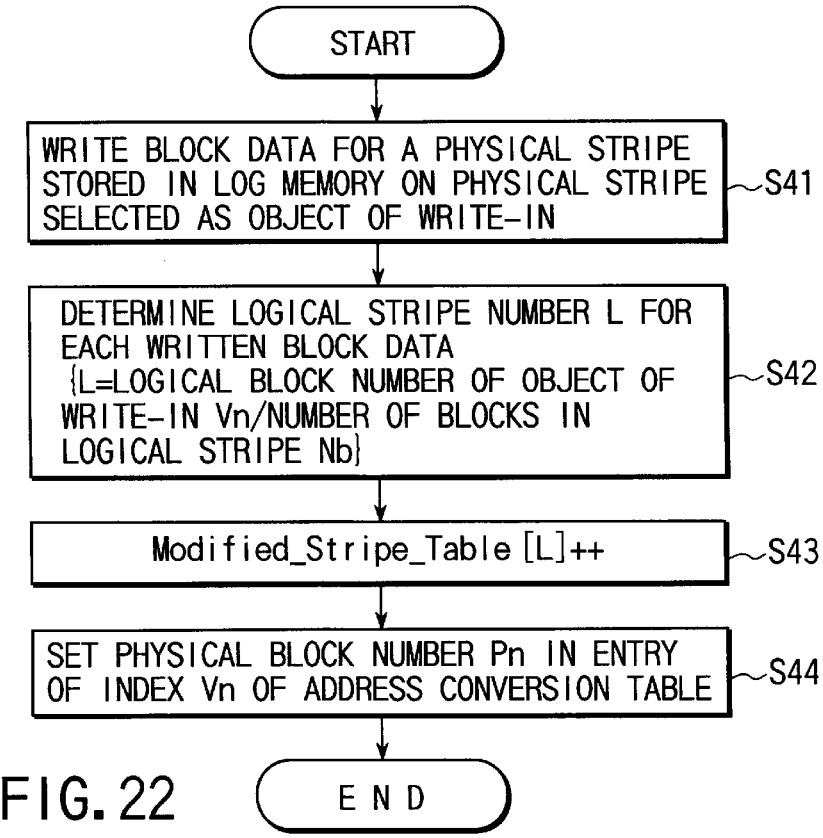
FIG. 22 is a flow chart of the processing operation for writing data of a computer system realized as a sixth embodiment of the invention.

FIG. 22 is a flow chart of the processing operation for writing data of a computer system realized as a sixth embodiment of the invention that is carried out by a RAID speeding driver 100.

Assume here that a number of write-ins counter is provided for each logical stripe and the number of times of write-ins of each logical stripe is controlled by means of the number of write-ins counter. Modified_Stripe_Table [ ] refers to the table of "the number of write-ins counter" showing "the number of write-ins counter reading", using the logical stripe number as index. The number of write-ins counter is initialized to 0 when at the time of the generation of the partition.

As shown in FIG. 22, when data blocks are stored in the log memory 171 by an amount good for a physical stripe, the data blocks are batch-written in a selected physical stripe (Step S41). Then, the logical stripe number L of the written data block is determined (Step S42). If the number of the logical block of each data block is Vn and the total number of blocks in each logical stripe is Nb, L is expressed by the equation below.

$$L = Vn/Nb$$

Then, the reading of the "number of write-ins counter" of the logical stripe L to which the logical block belongs is incremented to Modified_Stripe_Table [L]++ (Step S43). Thereafter, an ordinary write-in processing operation is carried out (Step S44). In other words, the physical block number Pn of the physical block subjected to an actual write-in operation is set for the entry of the address conversion table 172 corresponding to the logical block number Vn of each written data block (Step S44). Note that the above Steps S41 through S44 are carried out for all the blocks of the physical stripe.

Figure 23:
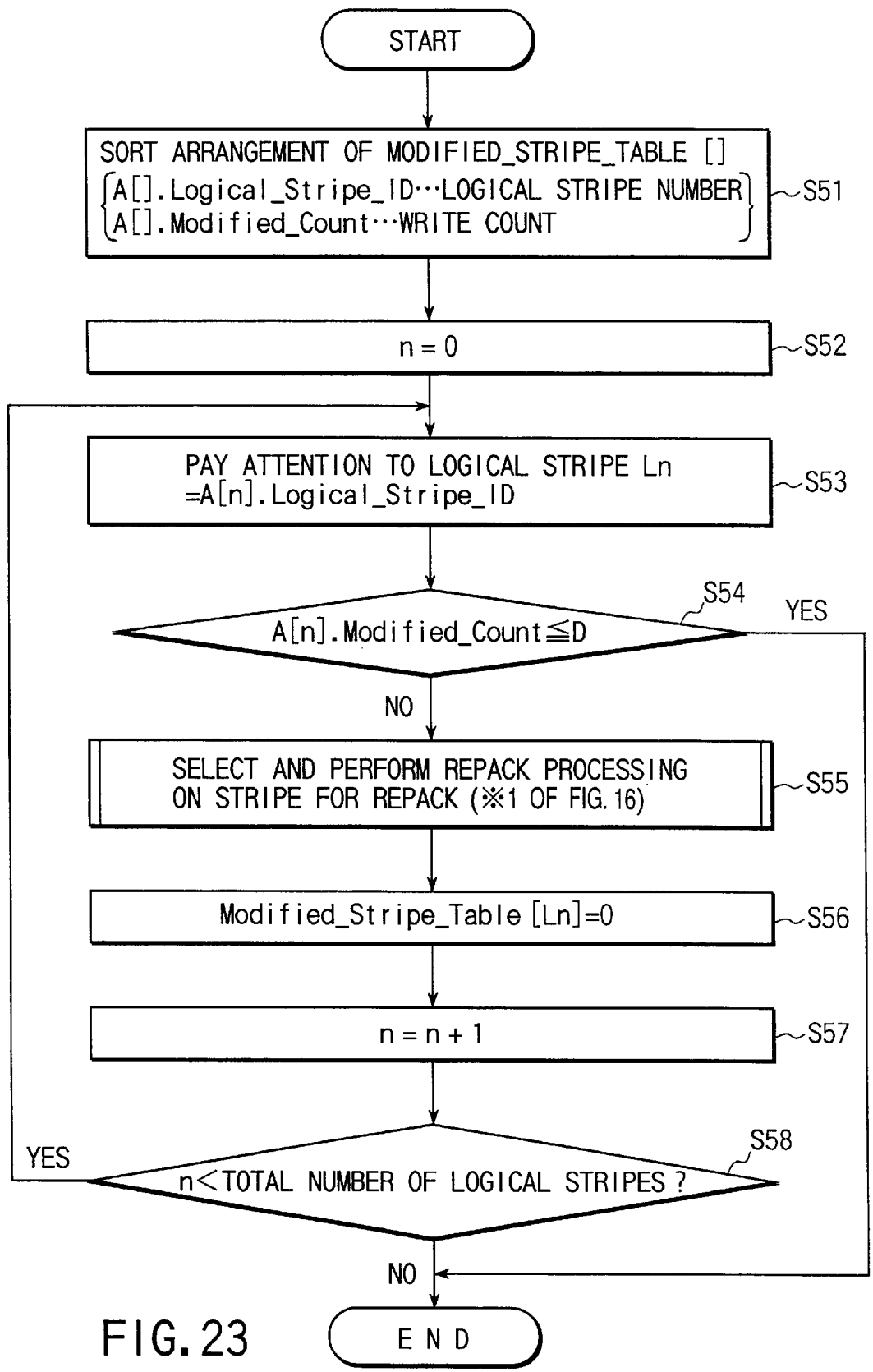
FIG. 23 is a flow chart of a repack control processing operation of the sixth embodiment that can be carried out in the computer system of FIG. 22.

FIG. 23 is a flow chart of a repack control processing operation of the sixth embodiment that can be carried out by the RAID speeding driver 100 of the computer system of FIG. 1 during the repack processing. While the contents of the address conversion table 172 were referenced in the order of index in FIG. 16, a "processing of selecting a stripe as object of repack" is carried out for each of the logical stripes showing a large number of times of write-ins by using Modified_Stripe_Table [ ] along with α and β.

More specifically, firstly, the logical stripe numbers are rearranged in the descending order of "the number of write-ins counter readings" so that a logical stripe showing a high number of write-ins counter reading is selected as object of repack early (Step S51). In Step S51, a new array A [ ] is also formed. Each entry of the array A [ ] includes two members of Logical_Stripe_ID and Modified_Count and expressed as follows by using the C language.

A [ ]. Logical_Stripe_ID

A [ ]. Modified_Count

Note that A [ ]. Logical_Stripe_ID indicates the logical stripe number (a value corresponding to the index of A [ ] Modified_Stripe_Table [ ]) and A [ ]. Modified_Count indicates the number of times of write-ins. As the values registered in the Modified_Stripe_Table [ ] are rearranged, the "number of write-ins counter reading" and the corresponding logical stripe number are respectively set in the above two members of the above array A in the descending order.

Thereafter, the entries are referenced in the order of registration in the array A [ ] and "the processing operation of selecting a stripe as object of repack and repacking it (operation as indicated by *1 in FIG. 16)" is carried out as long as there remains at least a logical stripe whose number of write-ins counter "A [ ]. Modified_Count" shows a reading not smaller than a predetermined value D. More specifically, n=0 is used firstly and, by paying attention to the logical stripe (L0=A [0]. Logical_Stripe_ID) showing the highest counter reading (Steps S52, S53), it is determined whether or not the number of write-ins counter (A[0]. Modified_Count) of the logical stripe is not greater than the predetermined value D (Step S54). If it is found that the number of write-ins count is greater than the predetermined value D, the processing operation of selecting a stripe as object of repack and repacking it is carried out on the basis of the values of α and β (Step S55). The number of write-ins counter of the logical stripe is cleared to 0 after the processing operation of selecting the stripe as object of repack regardless whether or not it is actually selected as object of repack (Step S56).

Thereafter, n+1 is used and, by paying attention to the logical stripe (L1=A [1]. Logical_Stripe_ID) showing the next highest counter reading (Steps S57, S58, S53), it is determined whether or not the reading of the number of write-ins counter (A [1]. Modified_Count) of the logical stripe is not greater than the predetermined value D (Step S54).

At the time when a logical stripe whose number of write-ins counter "A[n]. Modified_Count" shows a reading not greater than the predetermined value D is found (YES in Step S54), the processing operation is terminated. Thus, a logical stripe whose reading of the number of write-ins counter is high can be selected with priority as object of repack. Additionally, the load of the processing operation of selecting the stripe as object of repack can be reduced because only the logical stripes whose reading of the number of write-ins counter "A [ ] Modified_Count) is greater than the predetermined value D are subjected to the processing operation.

While a logical stripe is selected as object of repack with priority on the basis of α and β as defined in the description of the fourth embodiment by taking the number of read references and the number of write-ins respectively in the fifth embodiment and the sixth embodiment, it will be appreciated that a satisfactory effect can be achieved by determining a logical stripe as object of repack simply by controlling only the number of read references or the number of write-ins of by controlling by controlling both the number read references and the number of write-ins.

While this embodiment is described above in terms of a repack control processing operation for a disk array having a RAID configuration, it can be applied to any disk unit comprising a single disk drive and utilizing a log-structured write-in scheme.

A repack control processing operation of this embodiment can be carried out not only by means of a driver of a RAID high speeding driver 100 but also by means of the firmware of a RAID controller, that is incorporated in an OS.

Thus, according to the invention, it is possible to provide a disk control system and a data rearrangement method that are adapted to efficiently rearrange data and greatly improve the efficiency of data reading operations with a small load applied to the system. Particularly, physical stripes that need rearrangement can be selected efficiently by using the percentage of valid logical block numbers and/or the percentage of the consecutive logical address numbers of adjacently located logical blocks.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A disk control system using a log-structured write-in scheme and adapted to store data in a buffer and write a plurality of data blocks, which are stored in said buffer, into one physical stripe of a disk unit formed of a continuous storage region of said disk unit, said disk control system comprising:
   a data rearrangement part configured to rearrange the data written in said disk unit in units of one block so that data blocks with consecutive logical addresses are physically consecutive; and
   a rearrangement stripe determination part configured to computationally determine at least one of a percentage of valid blocks and a percentage of the consecutive logically addressed logical blocks that are physically adjacent in each physical stripe and to determine the physical stripes to be reconstructed by said data rearrangement part as objects of rearrangement.

2. The disk control system according to claim 1, wherein said data rearrangement part carries out a processing operation for data rearrangement each time a physical stripe is selected as an object of rearrangement by said rearrangement determination part.

3. A disk control system using a log-structured write-in scheme and adapted to store data in a buffer and write a plurality of data blocks, which are stored in said buffer, into one physical stripe of a disk unit formed of a continuous storage region of said disk unit, said disk control system comprising:
   a data rearrangement part configured to rearrange the data written in said disk unit in units of one block so that data blocks with consecutive logical addresses are physically consecutive;
   a rearrangement stripe determination part configured to computationally determine at least one of a percentage of valid blocks and a percentage of the consecutive logically addressed logical blocks that are physically adjacent in each physical stripe and to determine the physical stripes to be reconstructed by said data rearrangement part as objects of rearrangement,
   wherein said rearrangement stripe determination part selects physical stripes in the order of time and date of generation and determines whether each of the physical stripes should be selected as an object of rearrangement by computationally determining the percentage of valid blocks and the percentage of the consecutive logically addressed logical blocks that are physically adjacent and selects a physical stripe whose percentage of valid block numbers is greater than a predetermined value and whose percentage of consecutive logically addressed physically adjacent logical blocks is smaller than a predetermined value as an object of rearrangement.

4. The disk control system according to claim 1, further comprising a management part figured to measure the number of references to any of the data contained in each physical stripe, and wherein said rearrangement stripe determination part is adapted to determine which physical stripe having a number of references per unit time above a predetermined value and select the determined physical stripe as an object of rearrangement with priority.

5. A disk control system using a log-structured write-in scheme and adapted to store data in a buffer and write a plurality of data blocks, which are stored in said buffer, into one physical stripe of a disk unit formed of a continuous storage region of said disk unit, said disk control system comprising:

a data rearrangement part configured to rearrange the data written in said disk unit in units of one block so that data blocks with consecutive logical addresses are physically consecutive;

a rearrangement stripe determination part configured to computationally determine at least one of a percentage of valid blocks and a percentage of the consecutive logically addressed logical blocks that are physically adjacent in each physical stripe and to determine the physical stripes to be reconstructed by said data rearrangement part as objects of rearrangement; and a computation part configured to obtain logical stripe numbers corresponding to the valid blocks on the basis of the logical addresses of the valid blocks contained in the selected physical stripe and compute the largest number of blocks that correspond to a single logical stripe number among the logical stripe numbers, and wherein said rearrangement stripe determination part is adapted to select a physical stripe with the largest number of blocks below a predetermined value, as computed by said computation part, as an object of rearrangement with priority.

6. A disk control system using a log-structured write-in scheme and adapted to store data in a buffer and write a plurality of data blocks, which are stored in said buffer, into one physical stripe of a disk unit formed of a continuous storage region of said disk unit, said disk control system comprising:

a data rearrangement part configured to rearrange the data written in said disk unit in units of one block so that data blocks with consecutive logical addresses are physically consecutive, wherein said data rearrangement part is further configured to move a block from a different physical stripe belonging to an identical logical stripe number contained in the physical stripe to be rearranged and wherein the moved block belonging to the identical logical stripe number is written onto the disk unit as part of the rearranged data; and a rearrangement stripe determination part configured to computationally determine at least one of a percentage of valid blocks and a percentage of the consecutive logically addressed logical blocks that are physically adjacent in each physical stripe and to determine the physical stripes to be reconstructed by said data rearrangement part as objects of rearrangement.

7. The disk control system according to claim 6, wherein said data rearrangement part arranges the blocks to be written to a new physical stripe in the order of logical block number to improve the efficiency of sequentially reading the blocks.

8. The disk control system according to claim 6, wherein said data rearrangement part refrains from moving blocks from a physical stripe having a life time not longer than a predetermined.

9. A disk control system using a log-structured write-in scheme and adapted to store data in a buffer and write a plurality of data blocks, which are stored in said buffer, into one physical stripe of a disk unit formed of a continuous storage region of said disk unit, said disk control system comprising:

a data rearrangement part configured to rearrange the data written in said disk unit in units of one block so that data blocks with consecutive logical addresses are physically consecutive;

a rearrangement stripe determination part configured to computationally determine at least one of a percentage of valid blocks and a percentage of the consecutive logically addressed logical blocks that are physically adjacent in each physical stripe and to determine the physical stripes to be reconstructed by said data rearrangement part as objects of rearrangement; and an additional rearrangement part configured to rearrange physical stripes having a percentage of consecutive logically addressed logical blocks not smaller than a predetermined value on a physical stripe by physical stripe basis.

10. The disk control system according to claim 9, wherein said additional rearrangement part arranges all the blocks of the physical stripe selected for rearrangement in a physical stripe having a physical stripe number identical to the logical stripe number of the logical stripe that contains the majority of the valid blocks located in the physical stripe being rearranged.

11. A disk control system using a log-structured write-in scheme and adapted to store data in a buffer and write a plurality of data blocks, which are stored in said buffer, into one physical stripe of a disk unit formed of a continuous storage region of said disk unit, said disk control system comprising:

a determining part configured to determine the physical stripe as an object of rearrangement; and a data rearrangement part configured to rearrange the data written in said disk unit in units of one block so that data blocks with consecutive logical addresses are physically consecutive;

wherein said data rearrangement part is further configured to move a block from a different physical stripe belonging to an identical logical stripe number contained in the physical stripe to be rearranged and wherein the moved block belonging to the identical logical stripe number is written onto the disk unit as part of the rearranged data.

12. A data rearrangement method to be applied to a control system using a log-structured write-in scheme and adapted to store data in a buffer and write a plurality of data blocks, which are stored in said buffer, into one physical stripe of a disk unit formed of a continuous storage region of said disk unit, said data rearrangement method comprising:

rearranging the data written in said disk unit in units of one block so that data blocks with consecutive logical addresses are physically consecutive;

computationally determining at least one of a percentage of valid blocks and a percentage of the consecutive logically addressed logical blocks that are physically adjacent in each physical stripe; and determining the physical stripes to be reconstructed in said data rearranging step as objects of rearrangement.

13. The data rearrangement method according to claim 12, wherein rearranging the data includes carrying out a processing operation for data rearrangement each time a physical stripe is selected as an object of rearrangement by the determining.

14. The data rearrangement method according to claim 12, wherein determining the rearrangement stripe includes selecting physical stripes in the order of time and date of generation, and determining whether each of the physical stripes should be selected as an object of rearrangement by computationally determining the percentage of valid blocks and the percentage of consecutive logically addressed logical blocks that are physically adjacent.

15. The data rearrangement method according to claim 12, wherein determining the rearrangement stripe includes giving priority to a physical stripe having a number of references to data per unit of time that is not less than a predetermined value.

16. A data rearrangement method to be applied to a control system using a log-structured write-in scheme and adapted to store data in a buffer and write a plurality of data blocks, which are stored in said buffer, into one physical stripe of a disk unit formed of a continuous storage region of said disk unit, said data rearrangement method comprising:

determining the physical stripe as an object of rearrangement; and rearranging the data written in said disk unit in units of one block so that data blocks with consecutive logical addresses are physically consecutive;

wherein said data rearrangement step includes moving a block from a different physical stripe belonging to an identical logical stripe number contained in the physical stripe to be rearranged and wherein the moved block belonging to the identical logical stripe number is written onto the disk unit as part of the rearranged data.

17. A disk control system using a log-structured write-in scheme, said disk control system comprising:

a disk array constructed by a plurality of disk units;

a data buffer which stores a plurality of data blocks requested to be written;

a data write-in part which generates to-be-written data blocks for a physical stripe allocated from said disk array out of the plurality of data blocks stored in said data buffer and writes the to-be-written data blocks collectively in said physical stripe;

an address conversion table which stores, for a logical stripe, correspondence relations between a plurality of logical block numbers of the logical stripe and a plurality of physical block numbers indicating the physical positions on said disk array at which the data blocks specified by the logical block numbers exist;

a rearrangement stripe determination part which computes at least one of a percentage of valid logical blocks on the logical stripe and a percentage of logical data blocks located within the logical stripe that have consecutive physical address numbers to obtain a result, and selects the logical stripe as an object of rearrangement when the result satisfies a predetermined condition;

a data rearrangement part which reads the data blocks of the logical stripe selected as an object of rearrangement by said rearrangement stripe determination part and causes said data write-in part to write the data blocks of the selected logical stripe in an empty physical stripe region of said disk array; and an address conversion table rewriting part which rewrites the physical block numbers of said address conversion table with physical block numbers of said empty physical stripe.

18. A disk control system using a log-structured write-in scheme, said disk control system comprising:

a disk array constructed by a plurality of disk units;

a data buffer which stores a plurality of data blocks requested to be written;

a data write-in part which generates to-be-written data blocks for a physical stripe allocated from said disk array out of the plurality of data blocks stored in said data buffer and writes the to-be-written data blocks collectively in said physical stripe;

an address conversion table which stores, for a logical stripe, correspondence relations between a plurality of logical block numbers of the logical stripe and a plurality of physical block numbers indicating the physical positions on said disk array at which the data blocks specified by the logical block numbers exist;

a rearrangement stripe determination part which computes at least one of a percentage of valid logical blocks on the logical stripe and a percentage of logical data blocks located within the logical stripe that have consecutive physical address numbers to obtain a result, and selects the logical stripe as an object of rearrangement when the result satisfies a predetermined condition, wherein said rearrangement stripe determination part selects a logical stripe whose percentage of valid logical blocks is greater than a predetermined value and whose percentage of logical data blocks having consecutive physical address numbers is smaller than a second predetermined value as an object of rearrangement;

a data rearrangement part which reads the data blocks of the logical stripe selected as an object of rearrangement by said rearrangement stripe determination part and causes said data write-in part to write the data blocks of the selected logical stripe in an empty physical stripe region of said disk array; and an address conversion table rewriting part which rewrites the physical block numbers of said address conversion table with physical block numbers of said empty physical stripe.

19. A disk control system using a log-structured write-in scheme, said disk control system comprising:

a disk array constructed by a plurality of disk units;

a data buffer which stores a plurality of data blocks requested to be written;

a data write-in part which generates to-be-written data blocks for a physical stripe allocated from said disk array out of the plurality of data blocks stored in said data buffer and writes the to-be-written data blocks collectively in the physical stripe of said disk array;

an address conversion table which stores, for at least one logical stripe, correspondence relations between a plurality of logical block numbers of the logical stripe and a plurality of physical block numbers indicating physical positions on said disk array at which the data blocks specified by the logical block numbers exist;

a counter part for each logical stripe of a logical stripe management table containing at least one logical stripe, which is adapted to count the number of data reads for said logical blocks contained in each logical stripe;

a rearrangement stripe determination part which selects a logical stripe having a number of data reads count not smaller than a predetermined value as an object of rearrangement by referring to said counter part;

a data rearrangement part which reads the data blocks of the logical stripe selected as the object of rearrangement by said rearrangement stripe determination part and causes said data write-in part to write the data blocks of the selected logical stripe in an empty physical stripe region of said disk array; and an address conversion table rewriting part which rewrites said physical block numbers of said address conversion table with physical block numbers of said empty physical stripe.

20. A disk control system using a log-structured write-in scheme, said disk control system comprising:
- a disk array constructed by a plurality of disk units;
- a data buffer which stores a plurality of data blocks requested to be written;
- a data write-in part which generates to-be-written data blocks for a physical stripe allocated from said disk array out of the plurality of data blocks stored in said data buffer and writes the to-be-written data blocks collectively in the physical stripe of said disk array;
- an address conversion table which stores, for at least one logical stripe, correspondence relations between a plurality of logical block numbers of the logical stripe and a plurality of physical block numbers indicating physical positions on said disk array at which the data blocks specified by the logical block numbers exist;
- a counter part for each logical stripe of a logical stripe management table containing at least one logical stripe, which is adapted to count the number of data reads for said logical blocks contained in each logical stripe;
- a rearrangement stripe determination part which selects a logical stripe having a number of data reads count not smaller than a predetermined value as an object of rearrangement by referring to said counter part,
- wherein said rearrangement stripe determination part computationally determines at least one of a percentage of valid logical block numbers and a percentage of the consecutive physical address numbers of adjacent logical data blocks in said logical stripe and determines the logical stripe as object of rearrangement if at least one of the percentages satisfies a predetermined condition;
- a data rearrangement part which reads the data blocks of the logical stripe selected as the object of rearrangement by said rearrangement stripe determination part and causes said data write-in part to write the data blocks of the selected logical stripe in an empty physical stripe region of said disk array; and
- an address conversion table rewriting part which rewrites said physical block numbers of said address conversion table with physical block numbers of said empty physical stripe.

21. A disk control system using a log-structured write-in scheme, said disk control system comprising:
- a disk array constructed by a plurality of disk units;
- a data buffer which stores a plurality of data blocks requested to be written;
- a data write-in part which generates data to be written for a physical stripe of said disk array out of the plurality of data blocks stored in said data buffer and writes the data collectively in said physical stripe of said disk array;
- an address conversion table which stores for at least one logical stripe a correspondence between a plurality of logical block numbers of the logical stripe of said disk array and a plurality of physical block numbers indicating the physical positions on said disk array of the data blocks specified by the logical block numbers;
- a counter part for each logical stripe of a logical stripe management table containing at least one logical stripe, which is adapted to count the number of data writes for logical blocks contained in each logical stripe;
- a rearrangement stripe determination part which selects a logical stripe having a number of data write count not smaller than a predetermined value as an object of rearrangement by referring to said counter part;
- a data rearrangement part which reads the data blocks of said logical stripe selected by said rearrangement stripe determination part as the object of rearrangement and causes said data write-in means to write the data blocks of the selected logical stripe in an empty physical stripe region of said disk array; and
- an address conversion table rewriting part which rewrites said physical block numbers of said address conversion table with physical block numbers of said empty physical stripe.

22. A disk control system using a log-structured write-in scheme, said disk control system comprising:
- a disk array constructed by a plurality of disk units;
- a data buffer which stores a plurality of data blocks requested to be written;
- a data write-in part which generates data to be written for a physical stripe of said disk array out of the plurality of data blocks stored in said data buffer and writes the data collectively in said physical stripe of said disk array;
- an address conversion table which stores for at least one logical stripe a correspondence between a plurality of logical block numbers of the logical stripe of said disk array and a plurality of physical block numbers indicating the physical positions on said disk array of the data blocks specified by the logical block numbers;
- a counter part for each logical stripe of a logical stripe management table containing at least one logical stripe, which is adapted to count the number of data writes for logical blocks contained in each logical stripe;
- a rearrangement stripe determination part which selects a logical stripe having a number of data write count not smaller than a predetermined value as an object of rearrangement by referring to said counter part,
- wherein said rearrangement stripe determining part computationally determines at least one of a percentage of valid logical block numbers and a percentage of the consecutive physical address numbers of adjacent logical blocks of said logical stripe and determines the logical stripe as an object of rearrangement if at least one of the percentages satisfies a predetermined condition;
- a data rearrangement part which reads the data blocks of said logical stripe selected by said rearrangement stripe determination part as the object of rearrangement and causes said data write-in means to write the data blocks of the selected logical stripe in an empty physical stripe region of said disk array; and
- an address conversion table rewriting part which rewrites said physical block numbers of said address conversion table with physical block numbers of said empty physical stripe.

23. A data rearrangement method for rearranging the data blocks stored in a disk array comprising a plurality of disk units, said method comprising;
- storing a plurality of data blocks requested to be written in a data buffer;
- generating data to be written for a physical stripe of said disk array out of the plurality of data blocks stored in said data buffer;
- writing the generated data collectively in a predetermined physical stripe of said disk array;
- generating an address conversion table for storing, for a plurality of logical stripes, the correspondence between a plurality of logical data block numbers of each logical stripe of said disk array and a plurality of physical block numbers indicating the physical positions on said disk array of the data blocks specified by the plurality of logical block numbers;

computationally determining at least one of a percentage of valid logical block numbers and a percentage of the consecutive physical address numbers of adjacent logical data blocks in each logical stripe by referring to said address conversion table and selecting a logical stripe as an object of rearrangement when at least one percentage satisfies a predetermined condition;

rearranging data by reading the data blocks of said logical stripe selected as an object of rearrangement and writing the read data blocks in the empty physical stripe region of said disk array produced by said collectively writing step; and rewriting said physical block numbers of said address conversion table with physical block numbers of said empty physical stripe as a result of said data rearrangement.

24. A data rearrangement method for rearranging the data blocks stored in a disk array comprising a plurality of disk units, said method comprising;

storing a plurality of data blocks requested to be written in a data buffer;

generating data to be written for a physical stripe of said disk array out of the plurality of data blocks stored in said data buffer;

writing the generated data collectively in a predetermined physical stripe of said disk array;

generating an address conversion table for storing, for a plurality of logical stripes, the correspondence between a plurality of logical data block numbers of each logical stripe of said disk array and a plurality of physical block numbers indicating the physical positions on said disk array of the data blocks specified by the plurality of logical block numbers;

computationally determining at least one of a percentage of valid logical block numbers and a percentage of the consecutive physical address numbers of adjacent logical data blocks in each logical stripe by referring to said address conversion table and selecting a logical stripe whose percentage of valid logical block numbers is greater than a predetermined value and whose percentage of the consecutive physical address numbers of adjacently located logical blocks is smaller than a predetermined value as an object of rearrangement when at least one percentage satisfies a predetermined condition;

rearranging data by reading the data blocks of said logical stripe selected as an object of rearrangement and writing the read data blocks in the empty physical stripe region of said disk array produced by said collectively writing step; and rewriting said physical block numbers of said address conversion table with physical block numbers of said empty physical stripe as a result of said data rearrangement.

25. A data rearrangement method for rearranging the data blocks stored in a disk array comprising a plurality of disk units, said method comprising;

storing a plurality of data blocks requested to be written in a data buffer;

generating data to be written for a physical stripe of said disk array out of the plurality of data blocks stored in said data buffer;

writing the generated data collectively in a predetermined physical stripe of said disk array;

generating an address conversion table storing, for each of a plurality of logical stripes, the correspondence between a plurality of logical block numbers of each logical stripe of said disk array and a plurality of physical block numbers indicating the physical positions on said disk array of the data blocks specified by the plurality of logical block numbers;

counting the number of data reads for each logical block contained in each logical stripe;

determining the logical stripe showing a number of data reads not smaller than a predetermined value as an object of rearrangement by referring to said counting step;

rearranging data by reading the data blocks of said logical stripe determined as the object of rearrangement;

writing the read data blocks in the empty physical stripe region of said disk array produced by said collectively writing step; and rewriting said physical block numbers of said address conversion table with physical block numbers of said empty physical stripe as a result of said data rearrangement.

26. The data rearrangement method according to claim 25, determining the logical stripe as object of rearrangement includes computing at least one of a percentage of valid logical block numbers and a percentage of the consecutive physical address numbers of adjacent logical blocks of said logical stripe and determining the logical stripe as an object of rearrangement if at least one of the percentages satisfies a predetermined condition.

27. A data rearrangement method for rearranging the data blocks stored in a disk array comprising a plurality of disk units, said method comprising;

storing a plurality of data blocks requested to be written in a data buffer;

generating data to be written for a physical stripe of said disk array out of the plurality of data blocks stored in said data buffer;

writing the generated data collectively in a predetermined physical stripe of said disk array;

generating an address conversion table for storing, for each of a plurality of logical stripes, the correspondence between a plurality of logical block numbers of each logical stripe and a plurality of physical block numbers indicating the physical positions on said disk array of the data blocks specified by the plurality of logical block numbers;

counting the number of data write-ins for a plurality of logical blocks specified by the plurality of logical block numbers contained in each logical stripe;

determining the logical stripe showing a number of data write-ins not smaller than a predetermined value as an object of rearrangement by referring to the number of data write-ins counted;

rearranging data by reading the data blocks of said logical stripe determined as the object of rearrangement and writing the read data blocks in the empty physical stripe region of said disk array produced by said collectively writing step; and rewriting said physical block numbers of said address conversion table with physical block numbers of said empty physical stripe as a result of said data rearrangement.

28. The data rearrangement method according to claim 27, wherein determining the logical stripe as object of rearrangement includes computationally determining at least one of a percentage of valid logical block numbers and a percentage of the consecutive physical address numbers of adjacent logical data blocks of said logical stripe and determining the logical stripe as an object of rearrangement if at least one of the percentages satisfies a requirement.

* * * * *

UNITED STATES PATENT AND TRADEMARK OFFICE
CERTIFICATE OF CORRECTION

PATENT NO. : 6,609,176 B1
DATED : August 19, 2003
INVENTOR(S) : Mizuno

It is certified that error appears in the above-identified patent and that said Letters Patent is hereby corrected as shown below:

Column 27,
Line 55, after "predetermined" insert -- value --.

Column 28,
Line 58, after "determining" insert -- step --.

Signed and Sealed this

Twenty-eighth Day of October, 2003

JAMES E. ROGAN
*Director of the United States Patent and Trademark Office*